(12) United States Patent
Nakamura et al.

(10) Patent No.: US 10,139,862 B1
(45) Date of Patent: Nov. 27, 2018

(54) ELECTRONIC APPARATUS

(71) Applicant: LENOVO (SINGAPORE) PTE. LTD., Singapore (SG)

(72) Inventors: Fusanobu Nakamura, Yokohama (JP); Mitsuhiro Yamazaki, Yokohama (JP); Atsushi Nagashima, Yokohama (JP); Kazunori Yamamura, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/654,432

(22) Filed: Jul. 19, 2017

(30) Foreign Application Priority Data

May 26, 2017 (JP) .................................. 2017104226

(51) Int. Cl.
*G06F 1/16* (2006.01)
(52) U.S. Cl.
CPC ............ *G06F 1/1654* (2013.01); *G06F 1/162* (2013.01); *G06F 1/1616* (2013.01); *G06F 1/1626* (2013.01); *G06F 1/1643* (2013.01); *G06F 1/1656* (2013.01); *G06F 2200/1612* (2013.01); *G06F 2200/1614* (2013.01)
(58) Field of Classification Search
CPC .... G06F 1/1632; G06F 1/1654; G06F 1/1669; G06F 1/1677
See application file for complete search history.

(56) References Cited

U.S. PATENT DOCUMENTS

| 9,910,464 | B2 * | 3/2018 | Lyles | G06F 1/1681 |
| 2009/0251251 | A1 * | 10/2009 | Fullerton | H01F 7/0284 335/285 |
| 2010/0238620 | A1 * | 9/2010 | Fish | G06F 1/1616 361/679.09 |
| 2013/0113584 | A1 * | 5/2013 | Hunts | H01F 7/0242 335/285 |
| 2014/0355192 | A1 * | 12/2014 | Lin | G06F 1/1669 361/679.17 |
| 2015/0279535 | A1 * | 10/2015 | Arrington | G06F 1/1632 361/679.43 |
| 2016/0077549 | A1 * | 3/2016 | Wang | G06F 1/1632 710/304 |
| 2016/0149597 | A1 * | 5/2016 | Takasu | G06F 1/1669 455/127.2 |

(Continued)

FOREIGN PATENT DOCUMENTS

JP 2016071814 A 5/2016

*Primary Examiner* — Anthony Q Edwards
(74) *Attorney, Agent, or Firm* — Shimokaji IP

(57) ABSTRACT

There is provided an electronic apparatus capable of separating a portable information device and an accessory device easily while preventing the coupled state of both devices from being released accidentally. The electronic apparatus includes: a state detector provided in either the portable information device or the accessory device to detect whether the electronic apparatus is in a predetermined stable position; an intention detector that detects whether there is an intention of detaching the portable information device from the accessory device; and a control unit that operates a coupling mechanism when it is detected from an output of the state detector that the electronic apparatus is in the stable position, and when it is detected from an output of the intention detector that there is the intention of detaching the portable information device from the accessory device.

7 Claims, 20 Drawing Sheets

(56) References Cited

U.S. PATENT DOCUMENTS

| | | | |
|---|---|---|---|
| 2016/0284497 A1* | 9/2016 | Stryker | G06F 1/16 |
| 2017/0010657 A1* | 1/2017 | Schneider | G01B 5/24 |
| 2017/0017273 A1* | 1/2017 | Weldon | G06F 1/1654 |
| 2017/0083092 A1* | 3/2017 | Levesque | G06F 3/016 |
| 2018/0052495 A1* | 2/2018 | Bowers | G06F 1/1679 |
| 2018/0058120 A1* | 3/2018 | Hamel | E05D 11/082 |

* cited by examiner

ELECTRONIC APPARATUS

FIELD OF THE INVENTION

The present invention relates to an electronic apparatus including a portable information device and an accessory device removable from each other.

BACKGROUND OF THE INVENTION

Recently, tablet PCs having a touch panel type liquid crystal display without any physical keyboard have spread rapidly. The tablet PCs are easy to carry around, and easy to handle because input work can be done on a touch panel. However, the tablet PCs do not have any physical keyboard, and this may affect work to enter long text and the like.

Therefore, the present applicant proposes an electronic apparatus provided with an accessory device to which a tablet PC is removably attachable using a magnet (see Patent Document 1). This electronic apparatus can be used as a laptop PC by attaching the tablet PC to the accessory device.

[Patent Document 1] Japanese Patent Application Laid-Open No. 2016-71814

SUMMARY OF THE INVENTION

For example, while the above conventional electronic apparatus is being hand-carried, if the coupled state of the tablet PC and the accessory device is accidentally released, the devices might fall. Further, if the release structure of the coupled state of both devices is complicated, the user-friendliness of the electronic apparatus will decrease. For example, such an action to lift up and detach a portable information device by one hand from a state of being placed on a desk becomes difficult.

The present invention has been made in view of the above conventional problem, and it is an object thereof to provide an electronic apparatus capable of separating a portable information device and an accessory device easily from each other while preventing the coupled state of both devices from being accidentally released.

An electronic apparatus according to one aspect of the present invention is an electronic apparatus including a portable information device and an accessory device capable of being removably coupled to each other through a coupling mechanism, including: a state detector provided in at least either one of the portable information device and the accessory device to detect whether the electronic apparatus is in a predetermined stable position; an intention detector that detects whether there is an intention of detaching the portable information device from the accessory device; and a control unit that operates the coupling mechanism when it is detected from output of the state detector that the electronic apparatus is in the stable position, and it is detected from output of the intention detector that there is the intention of detaching the portable information device from the accessory device.

According to this configuration, the electronic apparatus is such that the portable information device and the accessory device are coupled robustly through the coupling mechanism when the electronic apparatus is in the stable position and a user has no detaching intention. This can inhibit the portable information device and the accessory device from being separated from each other to make either one or both fall accidentally while the user is holding and carrying the electronic apparatus by a hand. Further, when it is detected that the user is to separate the portable information device from the accessory device, the electronic apparatus can be such that the coupled state through the coupling mechanism will be set, for example, to release (unlock) or relaxation (half-lock). Therefore, the user can separate the portable information device easily from the accessory device.

The coupling mechanism may also be configured to have a first attractive body and a second attractive body that are magnetically attracted to each other, and a moving part that relatively moves the first attractive body and the second attractive body to change the attracted state between the first attractive body and the second attractive body, wherein the moving part moves the first attractive body and the second attractive body relatively in a direction from a lock position, where an attractive force between the first attractive body and the second attractive body becomes large, to a half-lock position where the attractive force between the first attractive body and the second attractive body becomes smaller than that in the lock position.

The coupling mechanism may further be configured to have a first magnet provided in the accessory device, a second magnet provided in the portable information device to be able to be attracted to the first magnet, and a moving part provided in the accessory device to move the first magnet in order to change the attracted state between the first magnet and the second magnet. In this case, in the electronic apparatus, the control unit can control the drive of the moving part to adjust the coupling strength between the portable information device and the accessory device. Thus, for example, even when the first magnet and the second magnet are magnets having strong attractive forces, the portable information device and the accessory device can be separated smoothly.

Further, the moving part may be configured to be able to move the first magnet to a lock position where the attractive force between the first magnet and the second magnet becomes large, to an unlock position where a repulsive force is generated between the first magnet and the second magnet, and to a half-lock position where the attractive force between the first magnet and the second magnet becomes smaller than that in the lock position. In this case, since the coupled state between the portable information device and the accessory device can be controlled to the optimum state among the locked state, the unlocked state, and the half-locked state based on the detection results of the state detector and the intention detector, the user-friendliness of the electronic apparatus is improved.

The electronic apparatus may also be configured such that the state detector has an acceleration sensor, and the intention detector has at least either one of a first pressure-sensitive sensor provided on the outer surface of the portable information device and a second pressure-sensitive sensor provided on the outer surface of the accessory device.

The electronic apparatus may further be configured such that the state detector has an acceleration sensor, the moving part can move the first attractive body and the second attractive body relatively to a lock position where the attractive force between the first attractive body and the second attractive body becomes largest, to an unlock position where a repulsive force is generated between the first attractive body and the second attractive body, and to a half-lock position where the attractive force between the first attractive body and the second attractive body is set smaller than that in the lock position, the intention detector has a first pressure-sensitive sensor and a second pressure-sensitive sensor, and when it is detected from output of the first pressure-sensitive sensor and the second pressure-sensitive sensor that there is an intention of detaching the portable information device from the accessory device in such a state that the electronic apparatus is detected to be in the stable position from output of the acceleration sensor, the control unit changes the first attractive body from the lock position to the unlock position, while when it is detected from only either one of the first pressure-sensitive sensor and the second pressure-sensitive sensor that there is the intention of detaching the portable information device from the accessory device in the state where the electronic apparatus is detected to be in the stable position from the output of the acceleration sensor, the control unit changes the first attractive body from the lock position to the half-lock position.

Further, the electronic apparatus may be configured such that the state detector has an acceleration sensor, and the intention detector has at least either one of a pressure-sensitive sensor provided on the outer surface of the portable information device and a torque sensor that detects torque applied to a coupling part between the portable information device and the accessory device.

Further, the electronic apparatus may be configured such that the state detector has an acceleration sensor, the moving part can move the first attractive body and the second attractive body relatively to a lock position where the attractive force between the first attractive body and the second attractive body becomes largest and to an unlock position where a repulsive force is generated between the first attractive body and the second attractive body, the intention detector has a pressure-sensitive sensor and a torque sensor that detects torque applied to a coupling part between the portable information device and the accessory device, and when it is detected from output of the pressure-sensitive sensor and the torque sensor that there is an intention of detaching the portable information device from the accessory device in such a state that the electronic apparatus is detected to be in the stable position from output of the acceleration sensor, the control unit changes the first attractive body from the lock position to the unlock position.

The moving part may also have a shape-memory alloy that elastically deforms when reaching a predetermined temperature or higher to move the first attractive body and the second attractive body relative to each other. The moving part may further have a shape-memory alloy that elastically deforms when reaching a predetermined temperature or higher to move the first magnet. In these cases, the electronic apparatus can be made smaller and lighter compared with a case where an electric motor or the like is used as an actuator of the moving part that constitutes part of the coupling mechanism.

An electronic apparatus according to another aspect of the present invention is an electronic apparatus including a portable information device and an accessory device capable of being removably coupled to each other through a coupling mechanism, wherein the coupling mechanism includes: a first magnet provided in the accessory device; a second magnet provided in the portable information device to be able to be attracted to the first magnet; and a moving part having a shape-memory alloy provided in the accessory device to deform elastically when reaching a predetermined temperature or higher so as to move the first magnet. According to this configuration, the electronic apparatus can be made smaller and lighter compared with a case where an electric motor or the like is used as an actuator of the moving part that constitutes part of the coupling mechanism.

The electronic apparatus may also be configured such that the moving part includes a slide member that supports the first magnet and slides in response to the elastic deformation of the shape-memory alloy, the first magnet is such that N poles and S poles are arrayed alternately on the surface of the slide member along a sliding direction of the slide member, and the second magnet has S poles and N poles alternately arrayed to face the N poles and S poles of the first magnet, respectively.

The electronic apparatus may further be configured such that the moving part includes a rotary member that supports the first magnet and rotates about an axis in response to the elastic deformation of the shape-memory alloy, the first magnet is such that N poles and S poles are provided alternately on the outer circumferential surface of the rotary member along a circumferential direction of the rotary member, and the second magnet is such that only either of an S pole and an N pole is provided to face the first magnet.

The above-described aspects of the present invention can separate both devices while preventing the coupled state of the portable information device and the accessory device of the electronic apparatus from being released accidentally.

DETAILED DESCRIPTION OF THE INVENTION

Preferred embodiments of electronic apparatuses according to the present invention will be described in detail below with reference to the accompanying drawings.

Figure 1:
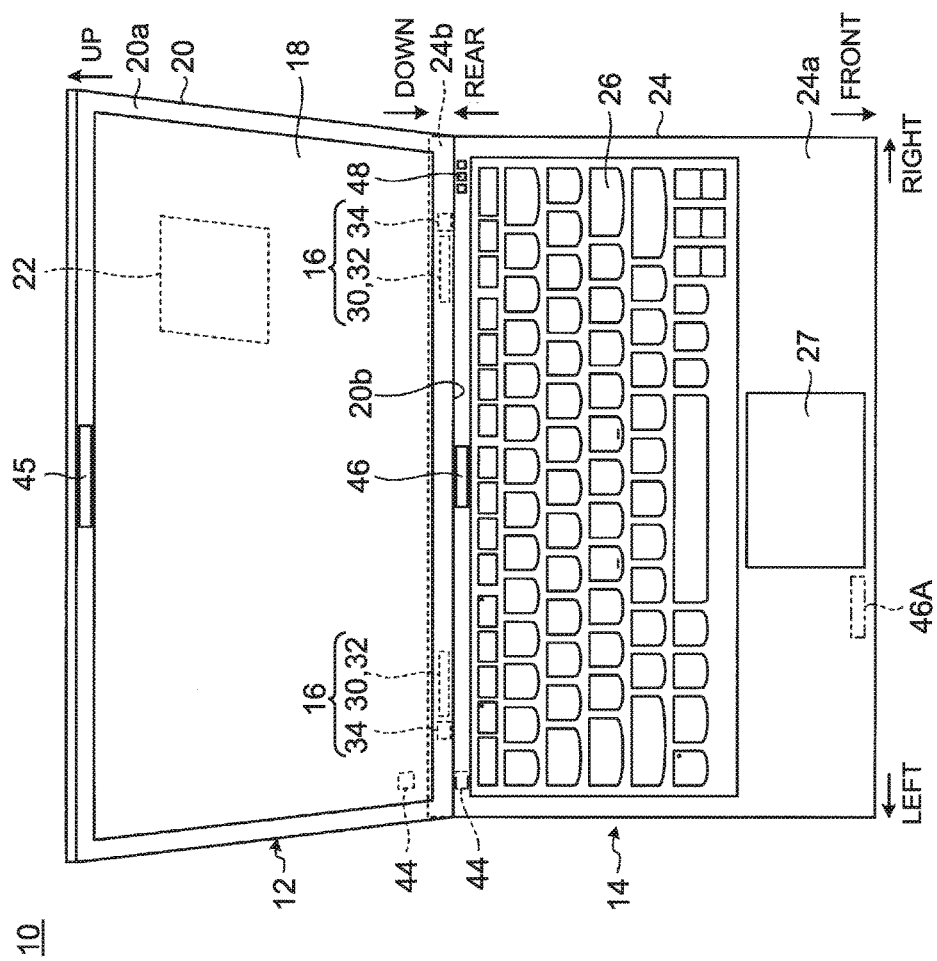
FIG. 1 is a configuration diagram of an electronic apparatus according to a first embodiment when looking down from a front upper side.
Figure 2A:
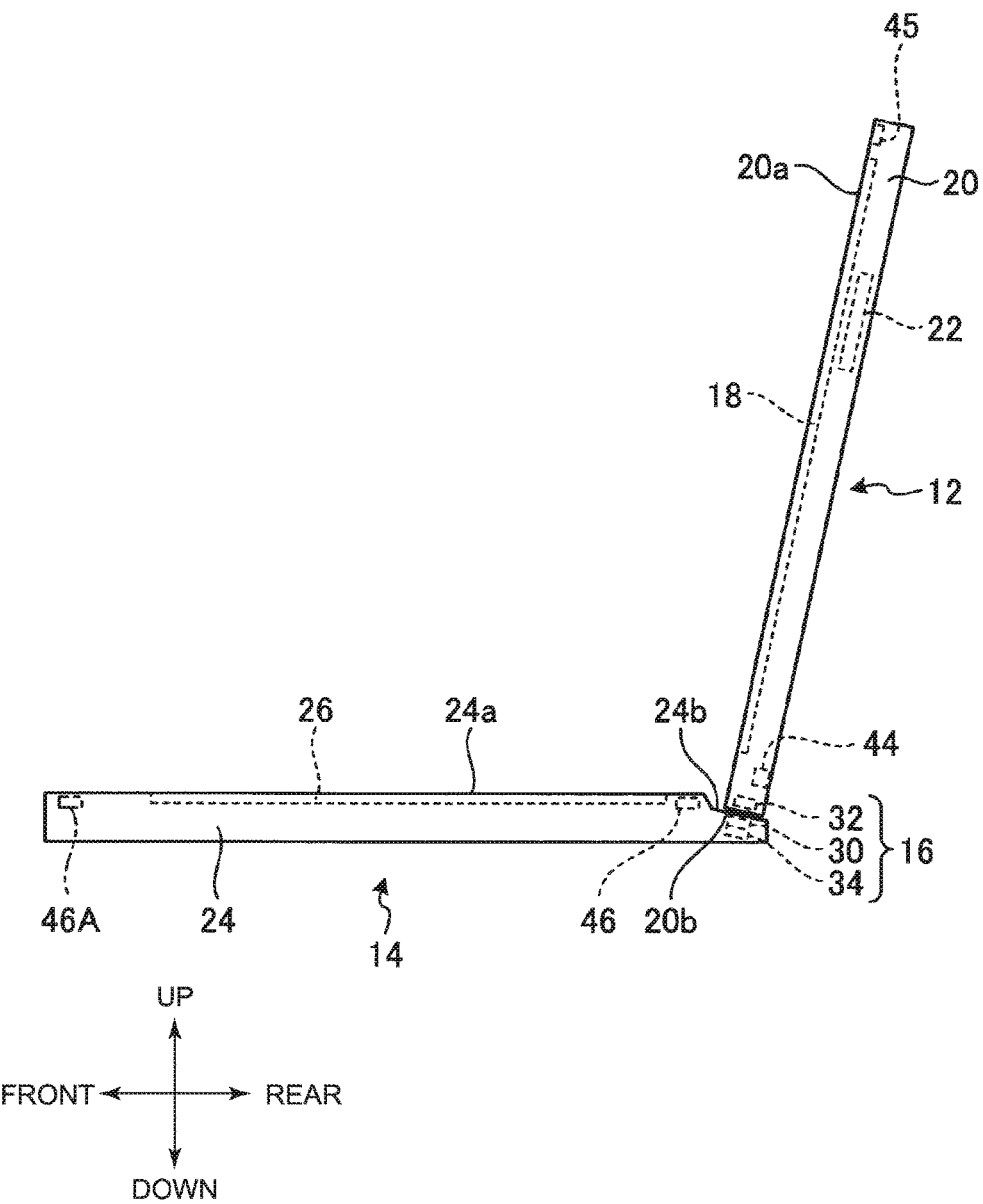
FIG. 2A is a side view of the electronic apparatus illustrated in FIG. 1.
Figure 2B:
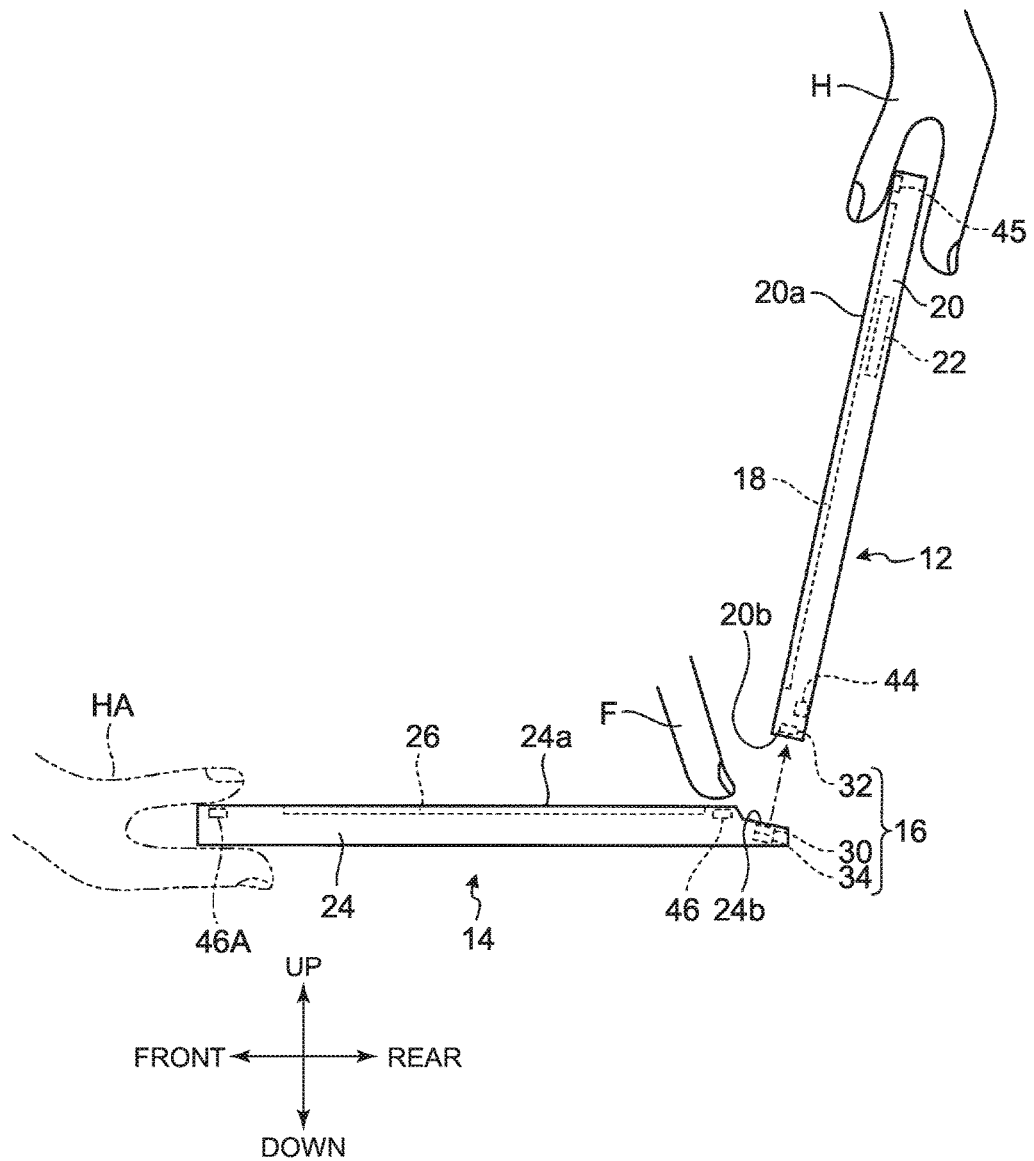
FIG. 2B is a side view of the electronic apparatus illustrated in FIG. 2A, which illustrates a state in which a portable information device is detached from an accessory device.

FIG. 1 is a configuration diagram of an electronic apparatus 10 according to a first embodiment when looking down from a front upper side. FIG. 2A is a side view of the electronic apparatus 10 illustrated in FIG. 1. FIG. 2B is a side view of the electronic apparatus 10 illustrated in FIG. 2A, which illustrates a state where a portable information device 12 is detached from an accessory device 14.

As illustrated in FIG. 1, FIG. 2A, and FIG. 2B, the electronic apparatus 10 includes the portable information device 12 and the accessory device 14. The portable information device 12 and the accessory device 14 are removable from each other through a coupling mechanism 16.

The portable information device 12 is a tablet PC having, on a front face 20a of a chassis 20, a display 18 as a touch panel type liquid crystal display unit. The portable information device 12 internally houses various electronic components, such as a substrate, an arithmetic unit, and a memory. The arithmetic unit and the memory constitute a control unit 22 that performs various processing on the portable information device 12, including the drive control of the coupling mechanism 16. Note that the control unit 22 may be implemented by a processor or the like, such as a CPU (Central Processing Unit), executing a program, i.e., implemented in software, may be implemented in hardware such as an IC (Integrated Circuit) or the like, or may be implemented by using software and hardware in combination.

The portable information device 12 can be used independently without being coupled to the accessory device 14. In this disclosure, a lower face 20b of the chassis 20 of the portable information device 12 is an attaching face to the accessory device 14. In this disclosure, the tablet PC is exemplified as the portable information device 12, but the portable information device 12 may also be any one of various terminal devices such as a smartphone and a portable game machine.

The accessory device 14 is a keyboard device having a keyboard 26 and a touch pad 27 on an upper face 24a of a chassis 24. The lower face 20b of the portable information device 12 is removably coupled to a coupling face 24b at the rear end of the upper face 24a of the accessory device 14.

In the following description, the near side is called front, the far side is called rear, the left side and right side in the width direction are called left and right, and the upper side and lower side are called up and down based on a state in which a user is viewing the display 18 of the portable information device 12 coupled to the accessory device 14 as illustrated in FIG. 1, FIG. 2A, and FIG. 2B.

The coupling mechanism 16 includes a first magnet (first attractive body) 30 provided in the accessory device 14, a second magnet (second attractive body) 32 provided in the portable information device 12, and a moving part 34 provided in the accessory device 14 to move the first magnet 30.

In the coupling mechanism 16, the drive of the moving part 34 is controlled by the control unit 22. The moving part 34 moves the first magnet 30 to a lock position where the attractive force between the first magnet 30 and the second magnet 32 is relatively large (largest in this disclosure), to an unlock position where a repulsive force is generated between the first magnet 30 and the second magnet 32, and to a half-lock position where the attractive force between the first magnet 30 and the second magnet 32 is relatively small (smaller than that in the lock position).

Figure 3A:
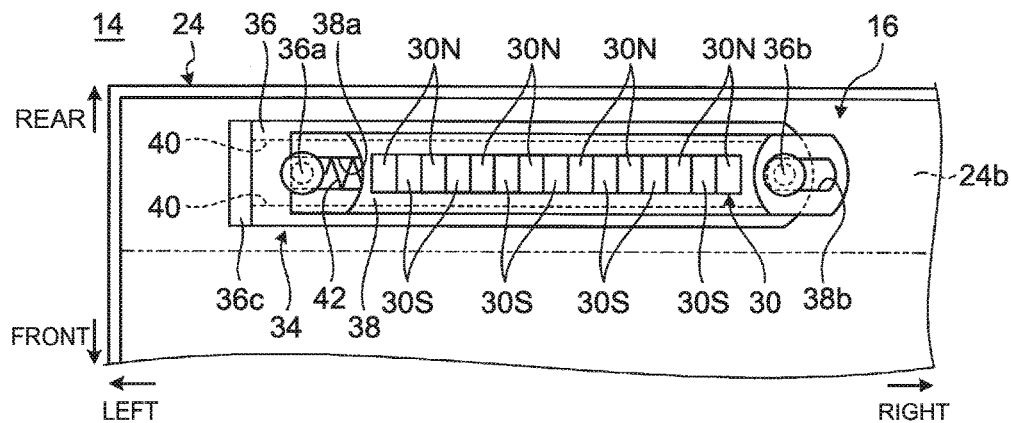
FIG. 3A is a plan view illustrating a structural example of a moving part.
Figure 3B:
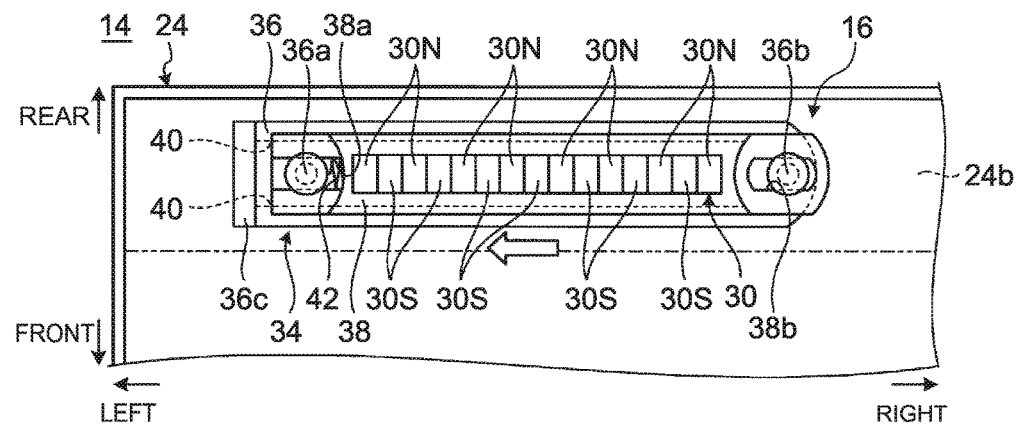
FIG. 3B is a plan view illustrating a state in which the moving part is operated from the state illustrated in FIG. 3A.
Figure 4:
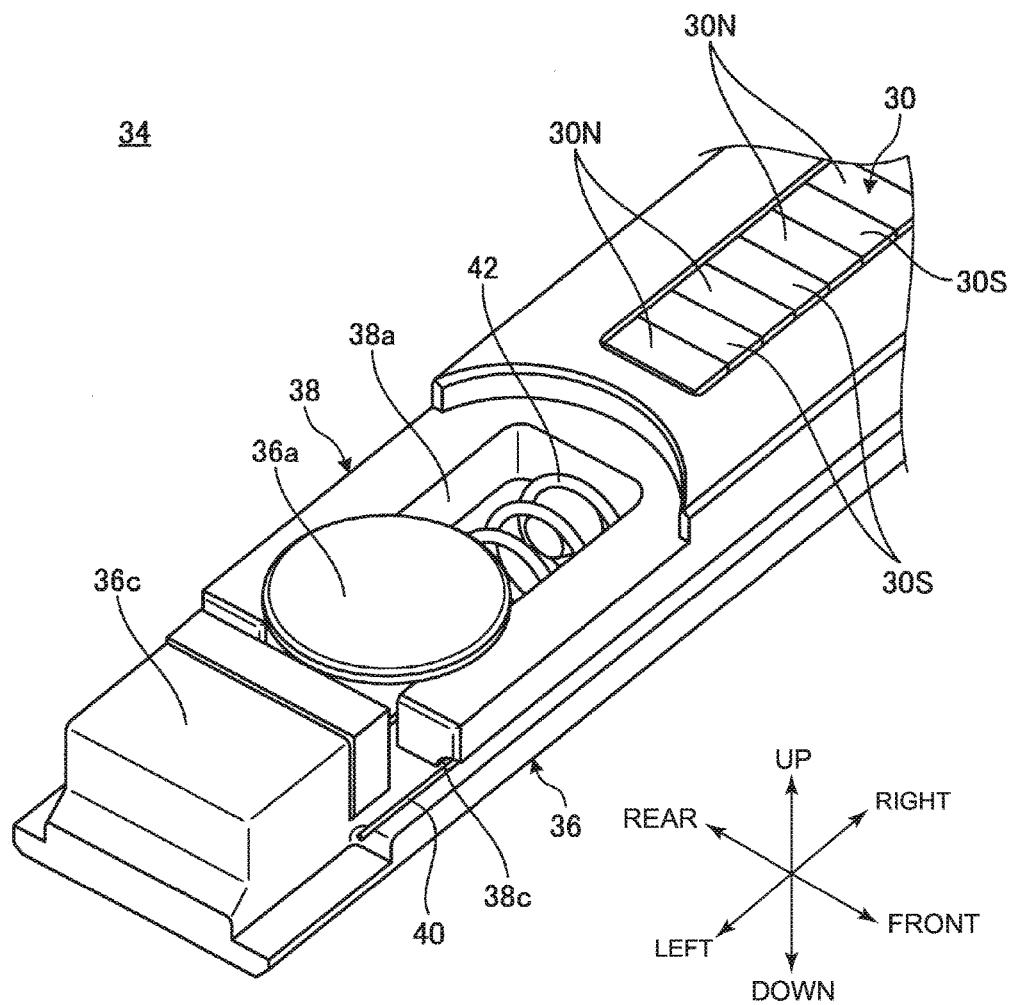
FIG. 4 is a partially enlarged perspective view of the moving part.

FIG. 3A is a plan view illustrating a structural example of the moving part 34. FIG. 3B is a plan view illustrating a state in which the moving part 34 is operated from the state illustrated in FIG. 3A. FIG. 4 is a partially enlarged perspective view of the moving part 34.

As illustrated in FIG. 1, moving parts 34 are provided in right and left positions near the rear ends inside the chassis 24, respectively. Since the right and left moving parts 34 have the same structure or bilaterally symmetric structures, only the left moving part 34 is illustrated in FIG. 3A and FIG. 3B. As illustrated in FIG. 3A, FIG. 3B, and FIG. 4, the moving part 34 has a slide base 36, a slide member 38, and a shape-memory alloy 40.

The slide base 36 is a plate-like member extending in the right-left direction, which is fixed to an inner bottom face of the chassis 24. On both end sides of the slide base 36, slide shaft pins 36a, 36b are provided in a protruding manner, respectively. Each of the slide shaft pins 36a, 36b is a nearly T-shaped pin in side view with a circular disc expanding the diameter provided at the upper end of the shaft. The slide base 36 has a stopper 36c protruding in a block shape at one end (left in FIG. 3A).

The slide member 38 is a plate-like member extending in the right-left direction, which is supported on the upper face of the slide base 36 to be slidable in the right-left direction. A U-shaped, depressed portion 38a extending in the right-left direction is provided at one end of the slide member 38, and a long hole 38b extending in the right-left direction is provided at the other end. The shaft of one slide shaft pin 36a is slidably inserted into the depressed portion 38a. The shaft of the other slide shaft pin 36b is slidably inserted into the long hole 38b. The slide member 38 is slidable in the right-left direction on the upper face of the slide base 36 under the guide action of the slide shaft pins 36a, 36b. A coil spring 42 is spanned between the wall surface of the depressed portion 38a opposite to the slide shaft pin 36a and the slide shaft pin 36a. The coil spring 42 always biases the slide member 38 in a direction (the right direction in FIG. 3A) in which the slide member 38 is separated from the slide shaft pin 36a.

The slide member 38 supports the first magnet 30 on the upper face thereof. The first magnet 30 is a magnet array in which magnets 30N arranged to make N poles face the upper face of the slide member 38, and magnets 30S arranged to make S poles face the upper face of the slide member 38 are arrayed alternately in the right-left direction.

The shape-memory alloy 40 is an alloy that returns to its original shape when being heated to a predetermined temperature or higher, which is connected to an electric circuit, not illustrated. A pair of front and rear shape-memory alloys 40 are provided on the upper face of the slide base 36 in the form of wires extending in the right-left direction. Each shape-memory alloy 40 passes through notches 38c formed in front and rear marginal portions of the lower face of the slide member 38, respectively (see FIG. 4). One end of each shape-memory alloy 40 is fixed to the slide base 36, and the other end thereof is fixed to the slide member 38. In this disclosure, the shape-memory alloy 40 has a contracted shape in the longitudinal direction when no current is applied, and returns to the original shape of extending in the longitudinal direction by Joule heat generated when a predetermined current is applied.

Since the coupling mechanism 16 is controlled by the control unit 22 as to whether current is applied to the shape-memory alloy 40 and the energization period of time, the shape-memory alloy 40 elastically deforms to expand or contract so as to slide the slide member 38 with respect to the slide base 36 in the right-left direction. As a result, the shape-memory alloy 40 functions as an actuator to make the first magnet 30 slide in the right-left direction.

Figure 5A:
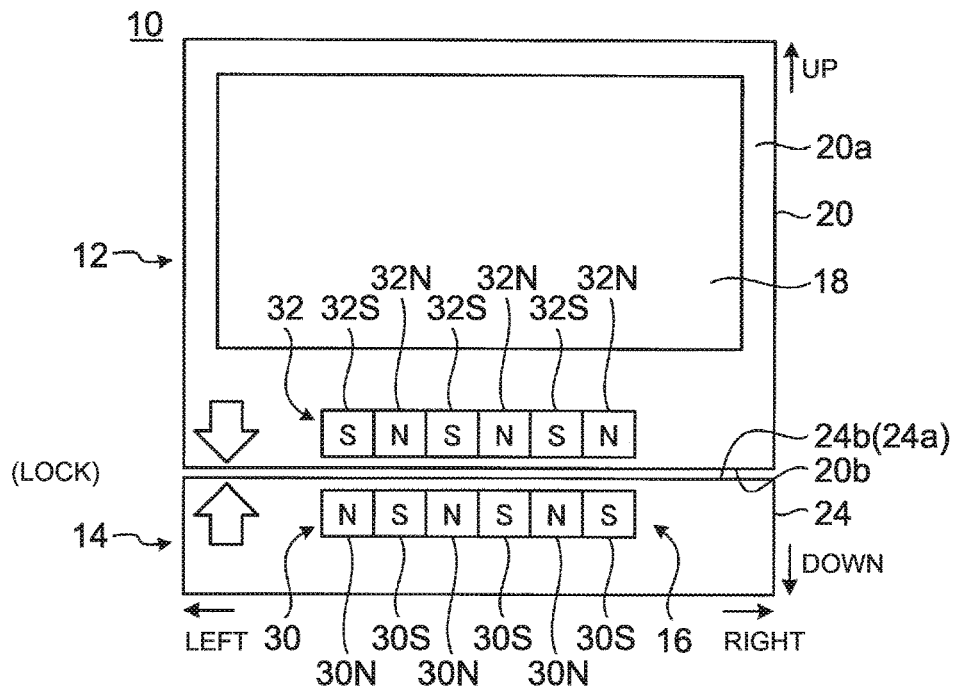
FIG. 5A is a schematic view illustrating a positional relation between a first magnet and a second magnet in a lock position.
Figure 5B:
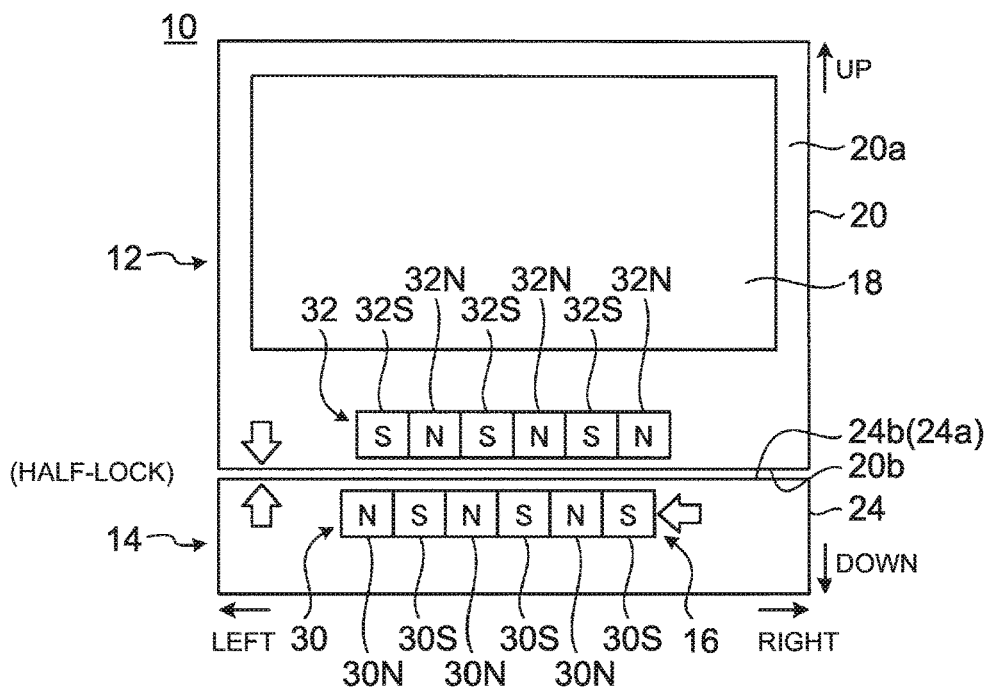
FIG. 5B is a schematic view illustrating a positional relation between the first magnet and the second magnet in a half-lock position.
Figure 5C:
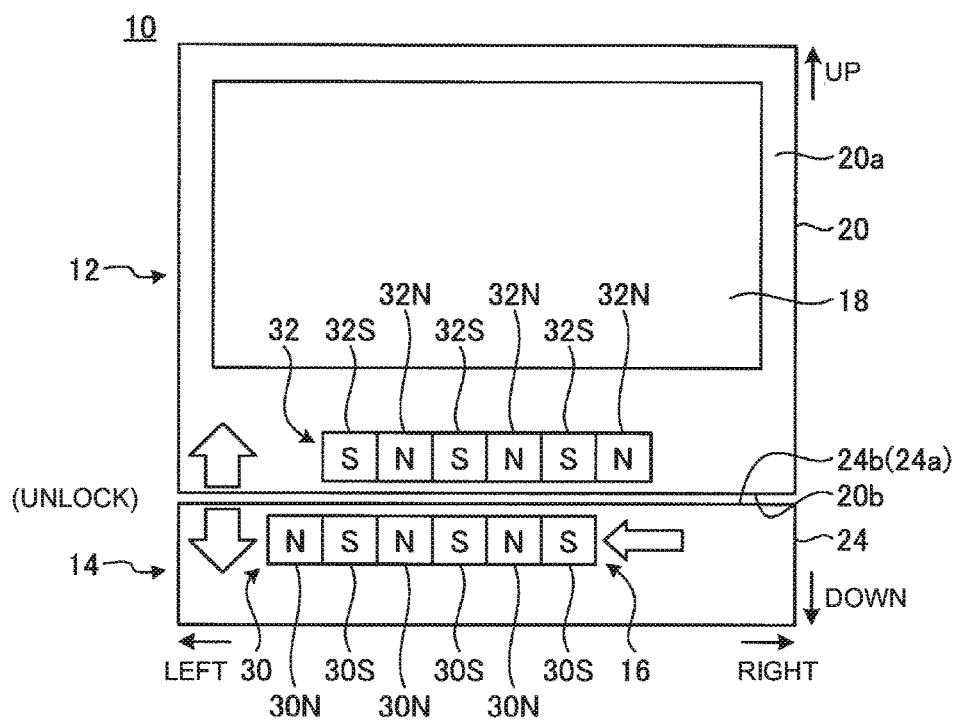
FIG. 5C is a schematic view illustrating a positional relation between the first magnet and the second magnet in an unlock position.

FIG. 5A is a schematic view illustrating a positional relation between the first magnet 30 and the second magnet 32 in the lock position. FIG. 5B is a schematic view illustrating a positional relation between the first magnet 30 and the second magnet 32 in the half-lock position. FIG. 5C is a schematic view illustrating a positional relation between the first magnet 30 and the second magnet 32 in the unlock position.

As illustrated in FIG. 5A, the second magnet 32 is a magnet array in which magnets 32N arranged to make N poles face the lower face 20b of the chassis 20 of the portable information device 12, and magnets 32S arranged to make S poles face the lower face 20b are arrayed alternately in the right-left direction.

In the lock position illustrated in FIG. 5A, the first magnet 30 and the second magnet 32 are in such a positional relation that the magnets 30N and the magnets 32S face each other, and the magnets 30S and the magnets 32N face each other, respectively. Therefore, the coupling mechanism 16 generates a large attractive force between the first magnet 30 and the second magnet 32 in the lock position. As a result, the portable information device 12 and the accessory device 14 are tightly coupled in the lock position.

In the half-lock position illustrated in FIG. 5B, the first magnet 30 and the second magnet 32 are in such a positional relation that the magnets 30N and the magnets 32S partially face each other, and the magnets 30S and the magnets 32N partially face each other, respectively. Therefore, the coupling mechanism 16 generates an attractive force, smaller than that in the lock position, between the first magnet 30 and the second magnet 32 in the half-lock position. As a result, the portable information device 12 and the accessory device 14 are coupled with a certain degree of strength in the half-lock position.

In the unlock position illustrated in FIG. 5C, the first magnet 30 and the second magnet 32 are in such a positional relation that the magnets 30N and the magnets 32N face each other, and the magnets 30S and the magnets 32S face each other, respectively. Therefore, the coupling mechanism 16 generates a repulsive force between the first magnet 30 and the second magnet 32 in the unlock position. As a result, the portable information device 12 and the accessory device 14 are forcibly separated from each other in the unlock position.

Thus, since the coupling mechanism 16 has the shape-memory alloy 40 functioning as an actuator under the control of the control unit 22, the first magnet 30 supported by the slide member 38 is slid over a predetermined distance, and this can adjust the attractive force between the first magnet 30 and the second magnet 32.

Returning to FIG. 1, FIG. 2A, and FIG. 2B, the portable information device 12 has an acceleration sensor 44 in an appropriate position (near the lower left corner in FIG. 1) inside the chassis 20. The acceleration sensor 44 is a sensor capable of detecting an inclination of the portable information device 12 (electronic apparatus 10). The acceleration sensor 44 may also be provided in the accessory device 14 in addition to that of the portable information device 12 or instead of that of the portable information device 12 (see the acceleration sensor 44 indicated by the dashed-two dotted line in FIG. 1). In general, the portable information device 12 such as the tablet PC is equipped with an acceleration sensor, for example, to control the display direction of the display 18 according to the attitude of the chassis 20. Thus, the acceleration sensor normally equipped in the portable information device 12 can be used as the acceleration sensor 44.

The portable information device 12 has a first pressure-sensitive sensor 45 at the upper end center of the front face 20a of the chassis 20. The accessory device 14 has a second pressure-sensitive sensor 46 at the rear end center of the upper face 24a of the chassis 24. Each of the pressure-sensitive sensors 45, 46 is a sensor capable of outputting a signal corresponding to a pressure change when being pressed with a finger or the like due to a change in resistance value by a contact pressure.

Figure 6:
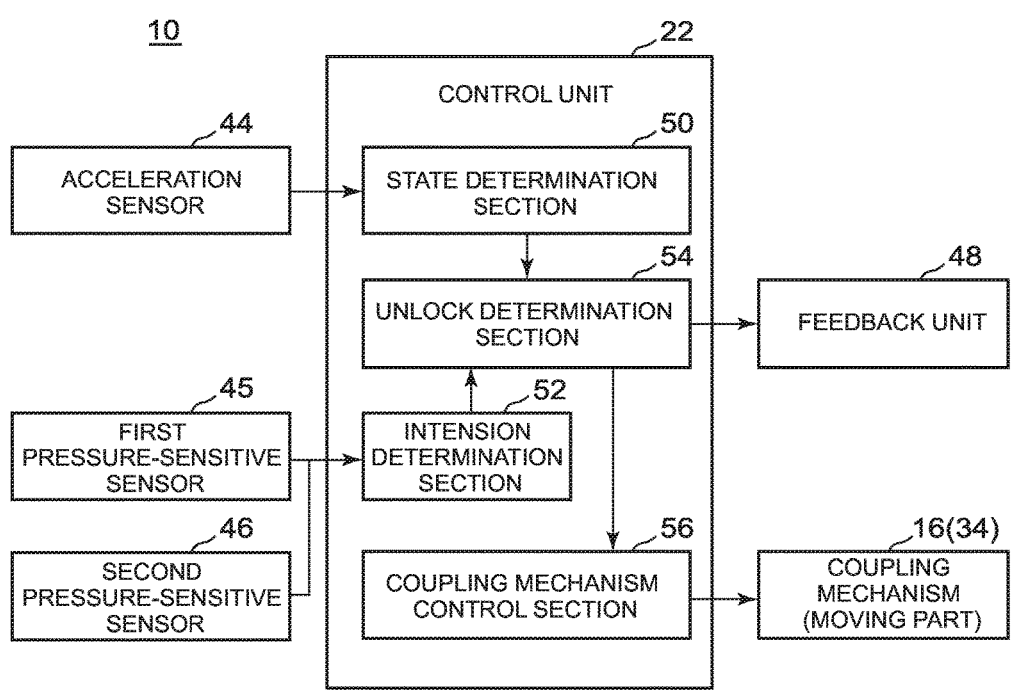
FIG. 6 is a block diagram illustrating a control system of the electronic apparatus.

FIG. 6 is a block diagram illustrating a control system of the electronic apparatus 10.

As illustrated in FIG. 6, the control system of the electronic apparatus 10 includes the acceleration sensor 44, the first pressure-sensitive sensor 45, the second pressure-sensitive sensor 46, the control unit 22, a feedback unit 48, and the coupling mechanism 16 (moving part 34). The control unit 22 has a state determination section 50, an intention determination section 52, unlock determination section 54, and a coupling mechanism control section 56. The state determination section 50, the intention determination section 52, the unlock determination section 54, and the coupling mechanism control section 56 may also be provided separately from the control unit 22.

Based on a detection signal from the acceleration sensor 44, the state determination section 50 determines whether the electronic apparatus 10 (portable information device 12) is in a predetermined stable position, and notifies the determination result to the unlock determination section 54. For example, when determining, from the detection result of the acceleration sensor 44, that the portable information device 12 is stable at a constant angle without any large movement for a given length of time, the state determination section 50 determines that the electronic apparatus 10 is in the predetermined stable position. This stable position is, for example, a state in which the electronic apparatus 10 is placed on a desk, or a state of being held tightly by a hand. Thus, the acceleration sensor 44 functions as a state detector that detects whether the electronic apparatus 10 (portable information device 12) is in the predetermined stable position.

Based on the detection signals from the first pressure-sensitive sensor 45 and the second pressure-sensitive sensor 46, the intention determination section 52 determines whether the user has the intention to detach the portable information device 12 from the accessory device 14, and notifies the determination result to the unlock determination section 54. For example, when the first pressure-sensitive sensor 45 and the second pressure-sensitive sensor 46 detect pressing operations at a pressure of a predetermined value or more, the intention determination section 52 determines that there is the intention to detach the portable information device 12 from the accessory device 14 (detaching intention). Even when either the first pressure-sensitive sensor 45 or the second pressure-sensitive sensor 46 detects the pressing operation at the pressure of the predetermined value or more, the intention determination section 52 may determine that there is the detaching intention. On the other hand, when either or both of the first pressure-sensitive sensor 45 and the second pressure-sensitive sensor 46 detects pressing operations at a pressure of less than the predetermined value, the intention determination section 52 determines that there is no detaching intention. Thus, each of the pressure-sensitive sensors 45, 46 functions as an intention detector that detects whether there is the intention to detach the portable information device 12 from the accessory device 14.

Based on the determination result of the state determination section 50 and the determination result of the intention determination section 52, the unlock determination section 54 determines whether to set the coupling mechanism 16 in any of the lock position, the half-lock position, and the unlock position, and notifies the determination result to the coupling mechanism control section 56. When receiving from the state determination section 50 that the electronic apparatus 10 is in the predetermined stable position, and from the intention determination section 52 that there is the detaching intention, the unlock determination section 54 sends the coupling mechanism control section 56 the determination result to control the coupling mechanism 16 to the half-lock position or the unlock position. On the other hand, when receiving from the state determination section 50 that the electronic apparatus 10 is not in the predetermined stable position, or when receiving from the intention determination section 52 that there is no detaching intention, the unlock determination section 54 sends the coupling mechanism control section 56 the determination result to keep the coupling mechanism 16 in the lock position.

Based on the determination result of the unlock determination section 54, the coupling mechanism control section 56 controls the drive of the moving part 34 of the coupling mechanism 16.

For example, as illustrated in FIG. 1, the feedback unit 48 is composed of small lamps provided on the upper face 24*a* of the accessory device 14. In this disclosure, the feedback unit 48 is composed of three lamps in a row to notify the user of the state of the lock position or the like of the coupling mechanism 16 depending on the lighting state of the lamps. The feedback unit 48 may also be configured to notify the user of the state of the lock position or the like of the coupling mechanism 16 by sound or vibration in addition to or instead of the lamps, or by providing a display on the display 18.

Next, the operation of detaching the portable information device 12 from the accessory device 14 in the electronic apparatus 10 will be described.

Figure 7A:
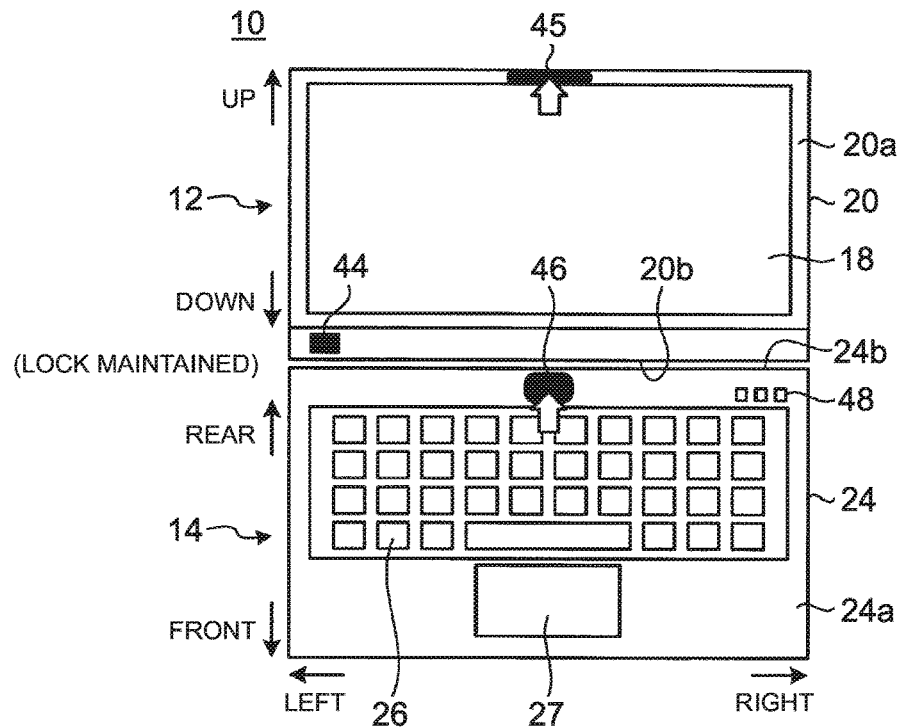
FIG. 7A is an explanatory view illustrating an example of an operation when a control unit keeps a coupling mechanism in the lock position.
Figure 7B:
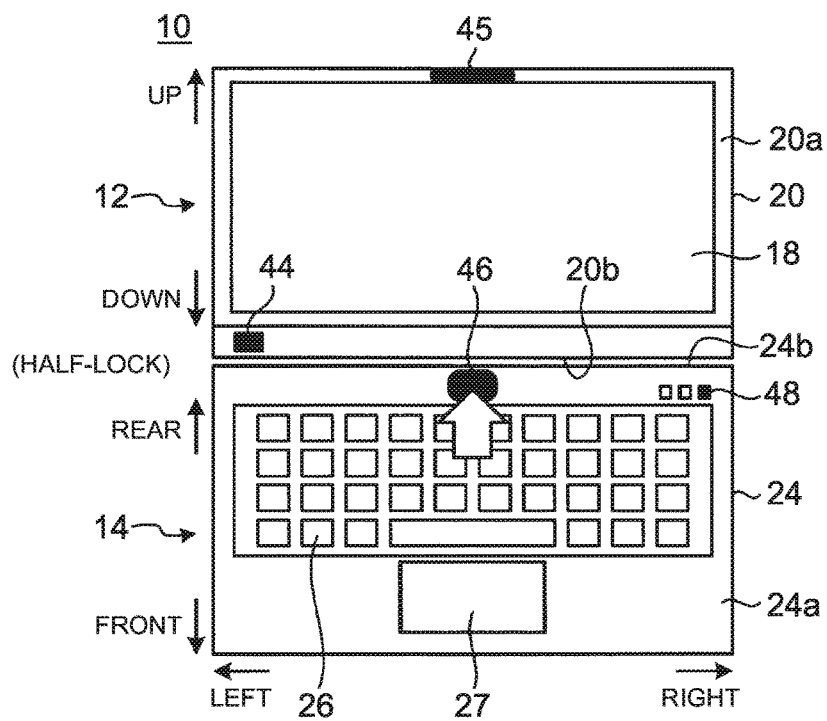
FIG. 7B is an explanatory view illustrating an example of an operation when the control unit operates the coupling mechanism to the half-lock position.
Figure 7C:
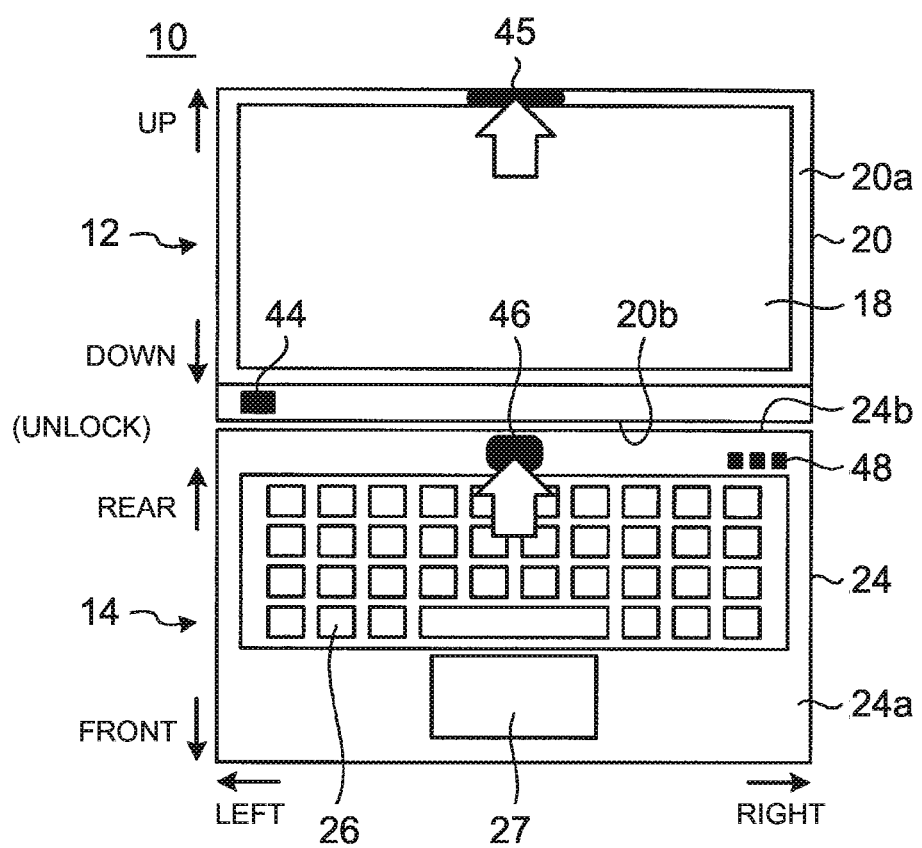
FIG. 7C is an explanatory view illustrating an example of an operation when the control unit operates the coupling mechanism to the unlock position.

FIG. 7A is an explanatory view illustrating an example of an operation when the control unit 22 keeps the coupling mechanism 16 in the lock position. FIG. 7B is an explanatory view illustrating an example of an operation when the control unit 22 operates the coupling mechanism 16 to the half-lock position. FIG. 7C is an explanatory view illustrating an example of an operation when the control unit 22 operates the coupling mechanism 16 to the unlock position.

When the electronic apparatus 10 is in such a state that the portable information device 12 is attached to the accessory device 14, the first magnet 30 of the coupling mechanism 16 is in the lock position as illustrated in FIG. 5A. In this case, in the electronic apparatus 10, the detection results from the acceleration sensor 44, the first pressure-sensitive sensor 45, and the second pressure-sensitive sensor 46 are received by the state determination section 50 and the intention determination section 52, and determination processing in the unlock determination section 54 is continuously performed.

In this state, suppose that the user touches the first pressure-sensitive sensor 45 and (or) the second pressure-sensitive sensor 46 at a pressure of less than the predetermined value without having the detaching intention as illustrated in FIG. 7A. In this case, the unlock determination section 54 notifies the coupling mechanism control section 56 to keep the coupling mechanism 16 in the lock position based on the determination result of the intention determination section 52 that the user has no detaching intention regardless of the determination result of the state determination section 50. As a result, the locked state in which the portable information device 12 and the accessory device 14 are in the tightly coupled state as illustrated in FIG. 5A is maintained. On this occasion, for example, the feedback unit 48 turns the three lamps off (see FIG. 7A).

Suppose next that the user presses only the second pressure-sensitive sensor 46 at a pressure of the predetermined value or more with the intention of detaching the portable information device 12 as illustrated in FIG. 7B. In this case, the intention determination section 52 determines, based on the detection result from the second pressure-sensitive sensor 46, that there is the detaching intention, and notifies the unlock determination section 54 of the detection results including the detection result from the first pressure-sensitive sensor 45 that is not pressed at the pressure of the predetermined value or more. As a result, when receiving, from the state determination section 50, such a determination result that the electronic apparatus 10 is in the predetermined stable position, the unlock determination section 54 sends a notification to the coupling mechanism control section 56 to operate the coupling mechanism 16 to the half-lock position.

In other words, when only the second pressure-sensitive sensor 46 is pressed, since no pressing operation is performed on the first pressure-sensitive sensor 45, it is not clear whether the portable information device 12 is held by the user. Therefore, the unlock determination section 54 determines to set the coupling mechanism 16 in the half-lock position in order to protect the portable information device 12 from being separated forcibly from the accessory device 14 to fall while determining the detaching intention of the user. As a result, the portable information device 12 and the accessory device 14 become the half-locked state in which both are coupled in a certain level of attractive force as illustrated in FIG. 5B. On this occasion, for example, the feedback unit 48 turns on only one lamp (see FIG. 7B). In the half-locked state, the attractive force between the first magnet 30 and the second magnet 32 is reduced compared with that in the locked state illustrated in FIG. 5A. Therefore, for example, the user can lift up the portable information device 12 as illustrated in FIG. 2B to detach the portable information device 12 easily from the accessory device 14.

Even when the user presses the first pressure-sensitive sensor 45 at the pressure of the predetermined value or more with the intention of detaching the portable information device 12 without operating the second pressure-sensitive sensor 46, the unlock determination section 54 may determine to set the coupling mechanism 16 in the half-lock position in the same manner as that mentioned above. Further, for example, when such a determination result that the electronic apparatus 10 is in the predetermined stable position is not obtained from the state determination section 50 even though the user presses the respective pressure-sensitive sensors 45, 46 at the pressure of the predetermined value or more with the intention of detaching the portable information device 12, the unlock determination section 54 may perform control to set the coupling mechanism 16 in the half-lock position.

Next, suppose that the user presses the first pressure-sensitive sensor 45 and the second pressure-sensitive sensor 46 at the pressure of the predetermined value or more with the intention of detaching the portable information device 12 as illustrated in FIG. 7C. In this case, the intention determination section 52 notifies the unlock determination section 54 of such a determination result that the user has the detaching intention. In this case, when receiving, from the state determination section 50, such a determination result that the electronic apparatus 10 is in the predetermined stable position, the unlock determination section 54 notifies the coupling mechanism control section 56 to operate the coupling mechanism 16 to the unlock position. As a result, the portable information device 12 and the accessory device 14 become the unlocked state as illustrated in FIG. 5C. On this occasion, for example, the feedback unit 48 turns on all the three lamps (see FIG. 7C).

In the unlocked state, a repulsive force is generated between the first magnet 30 and the second magnet 32 as illustrated in FIG. 5C. In other words, since the portable information device 12 is separated forcibly from the accessory device 14, the user can lift up the portable information device 12, for example, as illustrated in FIG. 2B to detach the portable information device 12 easily from the accessory device 14. In other words, the user presses the first pressure-sensitive sensor 45 at the same time when the user holds an upper edge portion of the portable information device 12 by one hand H, and presses the second pressure-sensitive sensor 46 with a finger F of the other hand to enable the electronic apparatus 10 to become the unlocked state in order to separate the devices 12 and 14 easily from each other.

Next, a variation of the electronic apparatus 10 will be described.

In the electronic apparatus 10 according to this variation, for example, the position of the second pressure-sensitive sensor 46 is moved and provided as a second pressure-sensitive sensor 46A near the center of a front edge portion of the upper face 24a of the chassis 24 as indicated by the two-dot chain line in FIG. 1. The second pressure-sensitive sensor 46A located in such a position can be used, for example, as an intention detector for the intention determination section 52 or a state detector for the state determination section 50. When the second pressure-sensitive sensor 46A is used as the intention detector, the second pressure-sensitive sensor 46A may be used in the same control pattern as that of the second pressure-sensitive sensor 46 mentioned above.

On the other hand, when the second pressure-sensitive sensor 46A is used as the state detector, the detection result of the second pressure-sensitive sensor 46A is sent to the state determination section 50. For example, suppose that the user lifts up and uses the electronic apparatus 10 while holding a front edge portion of the chassis 24 by one hand like a hand HA in FIG. 2B. In this state, when the user is to detach the portable information device 12 from the accessory device 14, the user presses the second pressure-sensitive sensor 46A with a finger of the hand HA at the pressure of the predetermined value or more. As a result, the state determination section 50 determines that the electronic apparatus 10 is in the predetermined stable position, and the unlock determination section 54 operates the coupling mechanism 16 to the half-lock position. Further, when the user presses the first pressure-sensitive sensor 45 at the pressure of the predetermined value or more while holding an upper edge portion of the portable information device 12 by the other hand H (see FIG. 2B), the unlock determination section 54 operates the coupling mechanism 16 to the unlock position. As a result, the user can detach the portable information device 12 easily from the accessory device 14 in a state of lifting up the electronic apparatus 10 by the hand. Of course, the state determination section 50 may also receive a detection signal from the acceleration sensor 44 simultaneously with the detection signal from the second pressure-sensitive sensor 46A to use the detection result of the acceleration sensor 44 for the determination by the state determination section 50.

Figure 8:
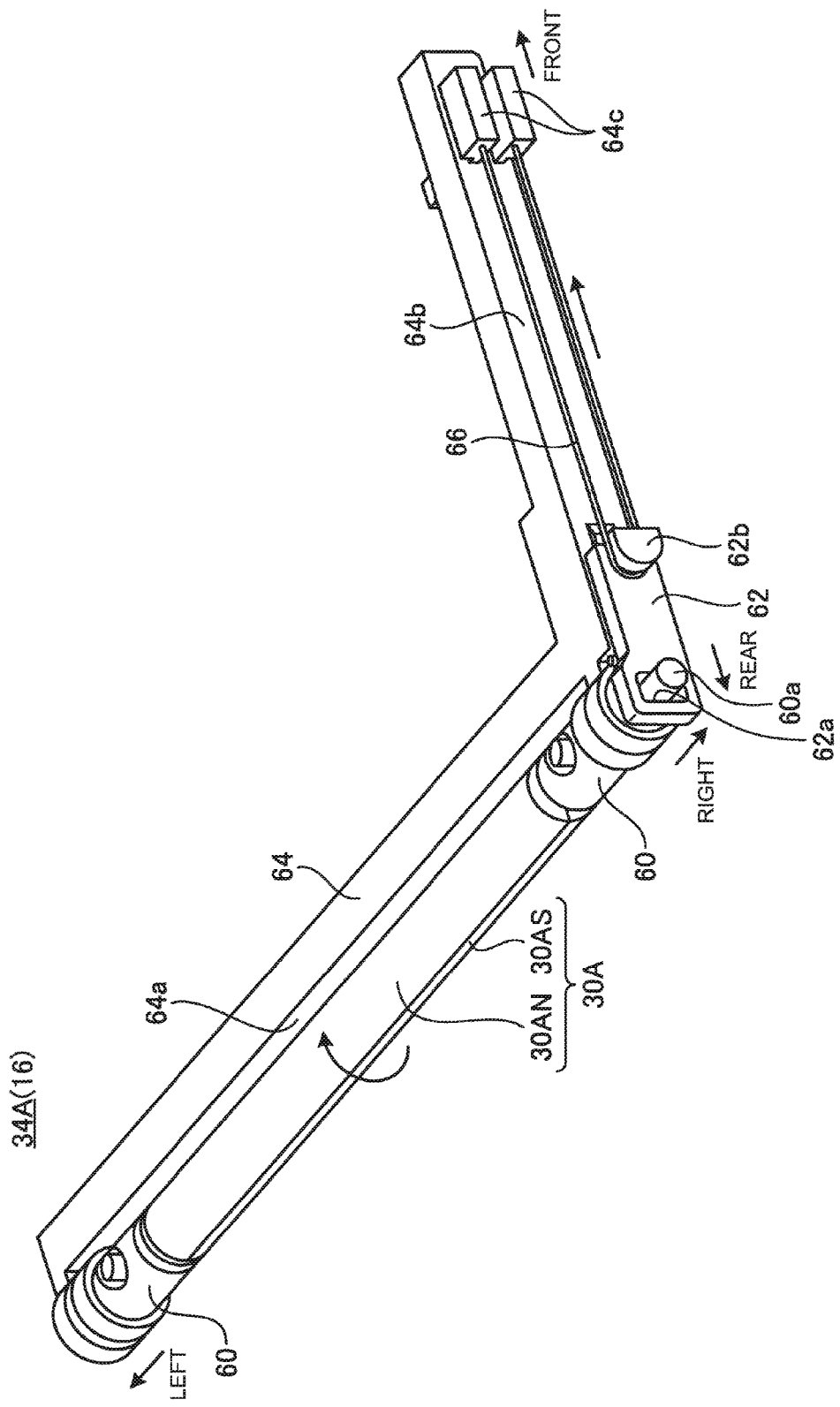
FIG. 8 is a perspective view illustrating a structural example of a moving part according to a variation.
Figure 9:
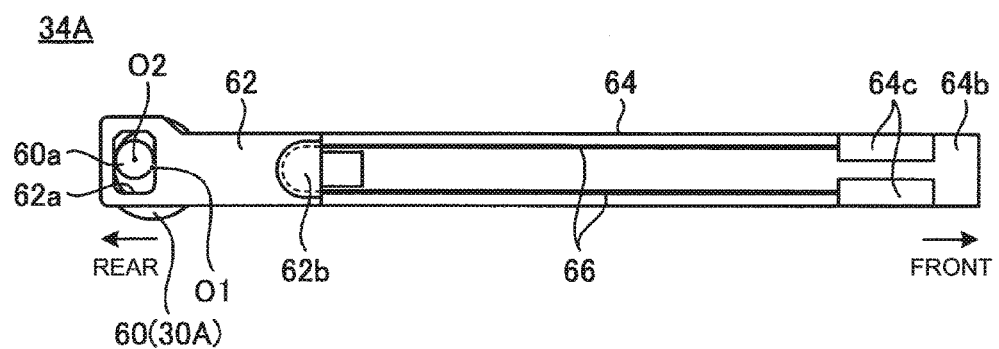
FIG. 9 is a side view of the moving part illustrated in FIG. 8.

FIG. 8 is a perspective view illustrating a structural example of a moving part 34A according to the variation. FIG. 9 is a side view of the moving part 34A illustrated in FIG. 8.

The above-mentioned moving part 34 has the slide member 38 slide the first magnet 30 on the side of the accessory device 14 to move relative to the second magnet 32 on the side of the portable information device 12. In contrast, the moving part 34A has a rotary member 60 rotate a first magnet 30A on the side of the accessory device 14 to move relative to a second magnet 32A (see FIG. 10A) on the side of the portable information device 12.

As illustrated in FIG. 8 and FIG. 9, the moving part 34A has the rotary member 60, a drive plate 62, a rotary base 64, and a shape-memory alloy 66. Like the moving part 34 illustrated in FIG. 3A, moving parts 34A are provided in positions on the right and left sides of the rear edge portions inside the chassis 24 together with first magnets 30A, respectively.

The rotary base 64 is an L-shaped member extending from the right-left direction to the front-rear direction, which is fixed to the bottom face inside the chassis 24. The rotary base 64 supports the rotary member 60 on a support face 64a along the right-left direction, and supports the drive plate 62 and the shape-memory alloy 66 on a support face 64b along the front-rear direction.

Each of rotary members 60 is a cylindrical shaft supported rotatably about the axis thereof in each of the right and left end portions of the support face 64a of the rotary base 64, respectively. The first magnet 30A is held between the right and left rotary members 60, 60. A pin 60a is provided in an end face of the right rotary member 60 in FIG. 8 to project from a position eccentric to an axial center O1 of the rotary member 60. In other words, an axial center O2 of the pin 60*a* is eccentric to the axial center O1 of the rotary member 60 (first magnet 30A).

The first magnet 30A is a cylindrical magnet concentrically supported between the rotary members 60, 60. When the coupling mechanism 16 is in the lock position, the first magnet 30A is so arranged that an N pole 30AN will face the upper half of the cylinder and an S pole 30AS will face the lower half of the cylinder (also see FIG. 10A).

The drive plate 62 is a plate extending in the front-rear direction. The drive plate 62 has a long hole 62*a* and a supporting part 62*b*. The long hole 62*a* is provided in a rear end portion of the drive plate 62 corresponding to a lateral position of the rotary member 60, which is a hole elongated in the up-down direction. In the long hole 62*a*, the pin 60*a* of the rotary member 60 is inserted to be slidable in the up-down direction. The supporting part 62*b* is a semicylindrical member projecting laterally from a front end portion of the drive plate 62.

Like the shape-memory alloy 40 mentioned above, the shape-memory alloy 66 is an alloy that returns to its original shape when being heated to a predetermined temperature or higher, which is connected to an electric circuit, not illustrated. The shape-memory alloy 66 is a U-shaped wire extending in the front-rear direction along the support face 64*b* of the rotary base 64, and bent around the supporting part 62*b* of the drive plate 62 and turned back. The U-shaped, turned-back portion of the shape-memory alloy 66 is wound around the supporting part 62*b*, and both ends thereof are fixed in parallel to support stands 64*c* provided on the support face 64*b* to project, respectively. In this disclosure, the shape-memory alloy 66 has a shape extending in the longitudinal direction when no current is applied, and returns to an original shape to expand or contract in the longitudinal direction by Joule heat generated when a predetermined current is applied.

Since the coupling mechanism 16 having the moving part 34A is controlled by the control unit 22 as to whether current is applied to the shape-memory alloy 66 and the energization period of time, the shape-memory alloy 66 elastically deforms to expand or contract so as to slide the drive plate 62 in the front-rear direction. This causes the pin 60*a* to be pressed by the long hole 62*a* to turn around the axial center O1 of the rotary member 60 as a turning center so as to rotate the rotary member 60 about the axial center O1. As a result, the shape-memory alloy 66 functions as an actuator to rotate the first magnet 30A about the axial center O1.

Figure 10A:
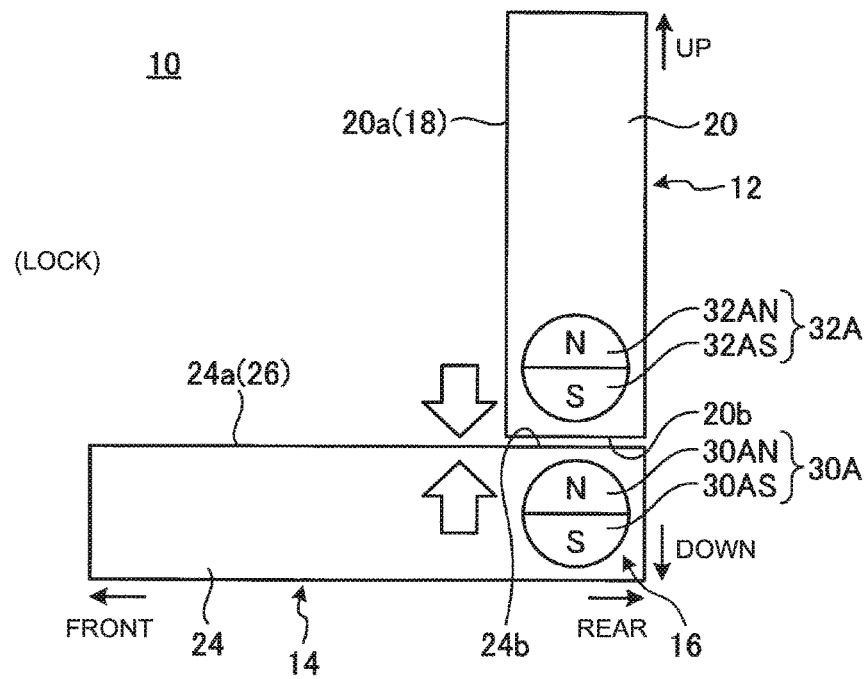
FIG. 10A is a schematic view illustrating a positional relation between a first magnet and a second magnet in the lock position.
Figure 10B:
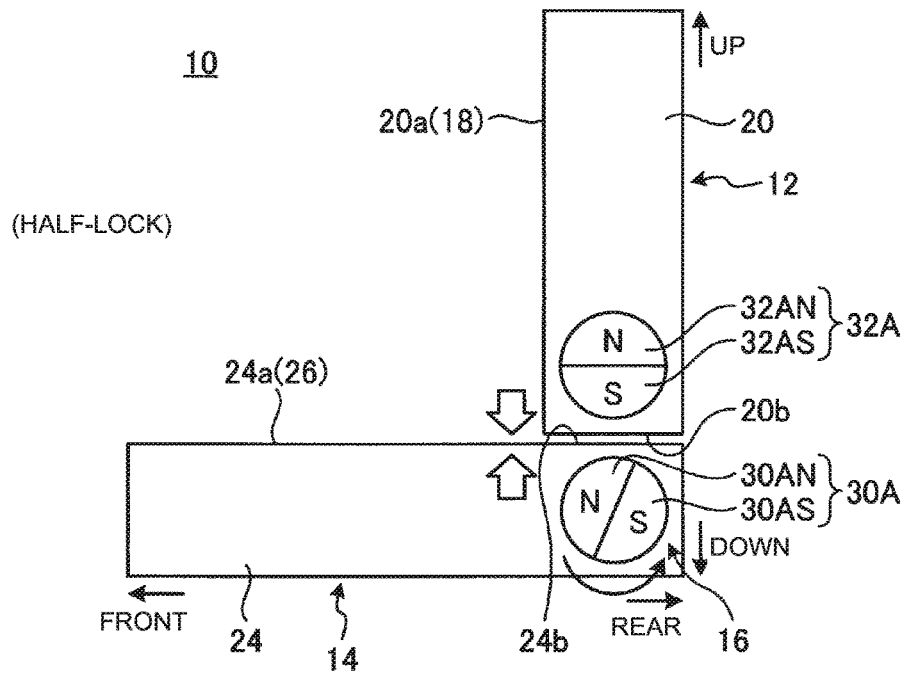
FIG. 10B is a schematic view illustrating a positional relation between the first magnet and the second magnet in the half-lock position.
Figure 10C:
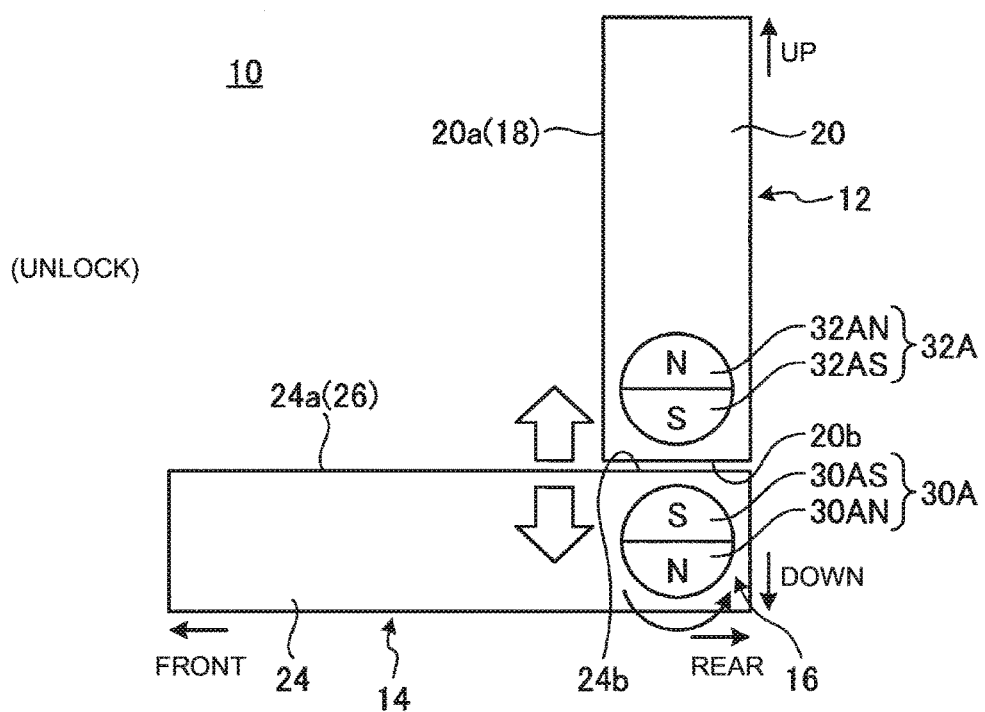
FIG. 10C is a schematic view illustrating a positional relation between the first magnet and the second magnet in the unlock position.

FIG. 10A is a schematic view illustrating a positional relation between the first magnet 30A and the second magnet 32A in the lock position. FIG. 10B is a schematic view illustrating a positional relation between the first magnet 30A and the second magnet 32A in the half-lock position. FIG. 10C is a schematic view illustrating a positional relation between the first magnet 30A and the second magnet 32A in the unlock position.

As illustrated in FIG. 10A, the second magnet 32A is a cylindrical magnet having substantially the same length and diameter as those of the first magnet 30A. The second magnet 32A is so arranged that an S pole 32AS will face the lower face 20*b* of the chassis 20 of the portable information device 12 and an N pole 32AN will face upward.

In the lock position illustrated in FIG. 10A, the first magnet 30A and the second magnet 32A are so positioned that the N pole 30AN and the S pole 32AS of the respective magnets will face each other. This causes the coupling mechanism 16 to generate a large attractive force between the first magnet 30A and the second magnet 32A in the lock position. As a result, the portable information device 12 and the accessory device 14 are tightly coupled in the lock position.

In the half-lock position illustrated in FIG. 10B, the first magnet 30A and the second magnet 32A are so positioned that the N pole 30AN and the S pole 32AS of the respective magnets will partially face each other. This causes the coupling mechanism 16 to generate an attractive force, smaller than that in the lock position, between the first magnet 30A and the second magnet 32A in the half-lock position. As a result, the portable information device 12 and the accessory device 14 are coupled with a certain degree of strength in the half-lock position.

In the unlock position illustrated in FIG. 10C, the first magnet 30A and the second magnet 32A are so positioned that the S pole 30AS and the S pole 32AS of the respective magnets will face each other. This causes the coupling mechanism 16 to generate a repulsive force between the first magnet 30A and the second magnet 32A in the unlock position. As a result, the portable information device 12 and the accessory device 14 are forcibly separated from each other in the unlock position.

Thus, since the moving part 34A has the shape-memory alloy 66 function as the actuator under the control of the control unit 22, the first magnet 30A supported by the rotary member 60 is rotated by a predetermined angle, and this can adjust the attractive force between the first magnet 30A and the second magnet 32A.

Figure 11:
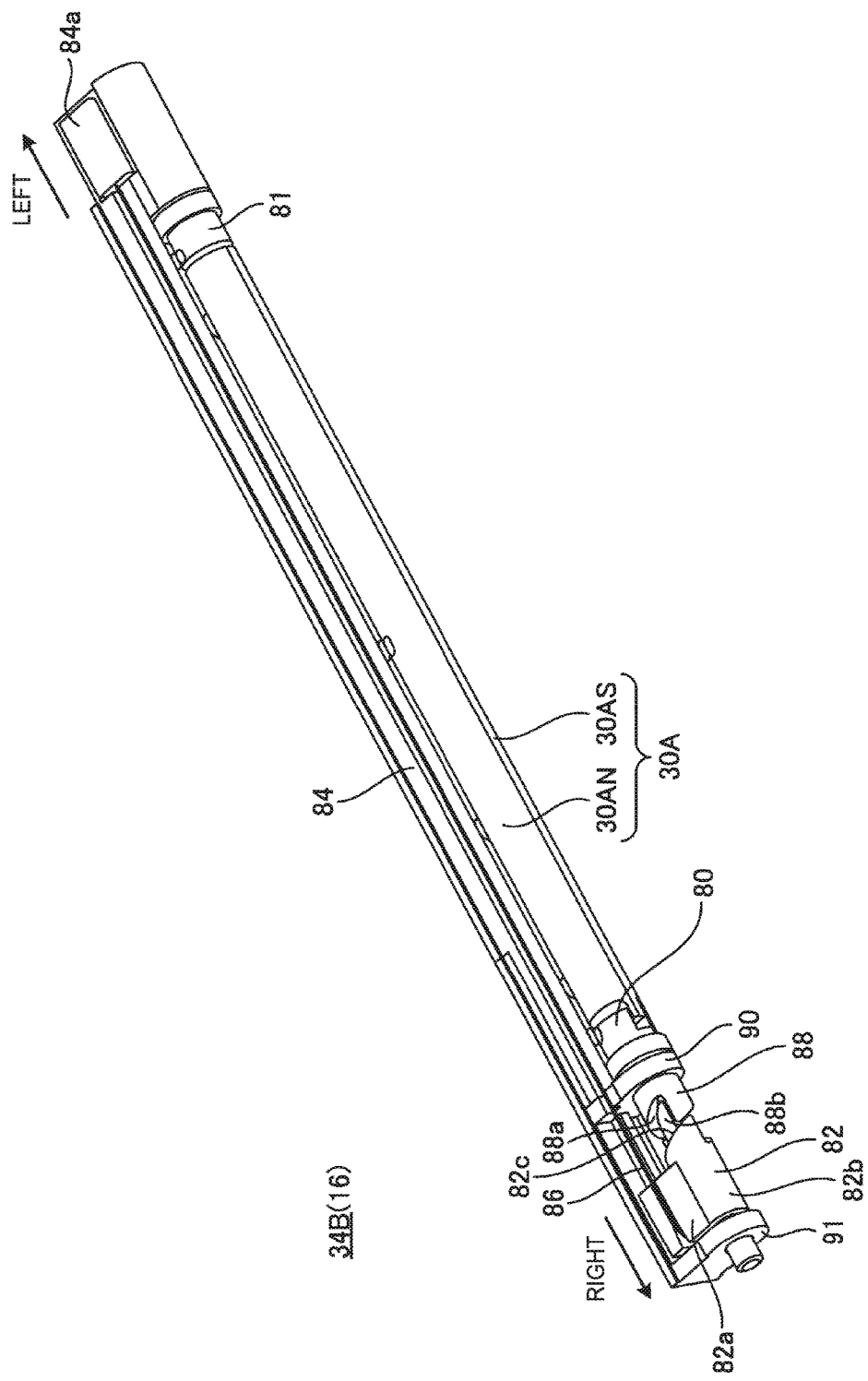
FIG. 11 is a perspective view illustrating a structural example of a moving part according to another variation.
Figure 12A:
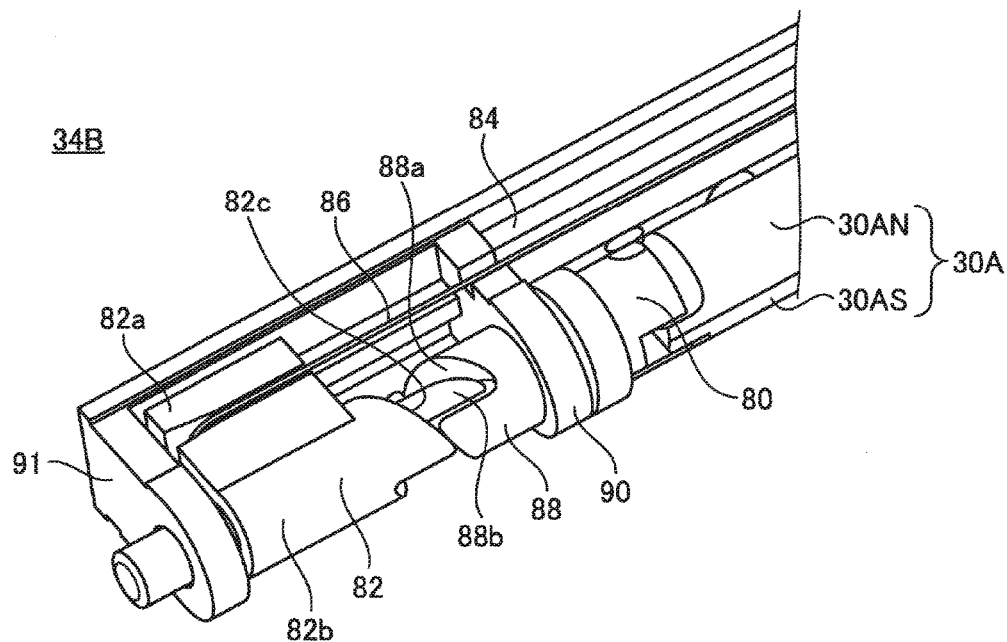
FIG. 12A is an enlarged perspective view of the main part in such a state that the moving part illustrated in FIG. 11 is in the lock position.
Figure 12B:
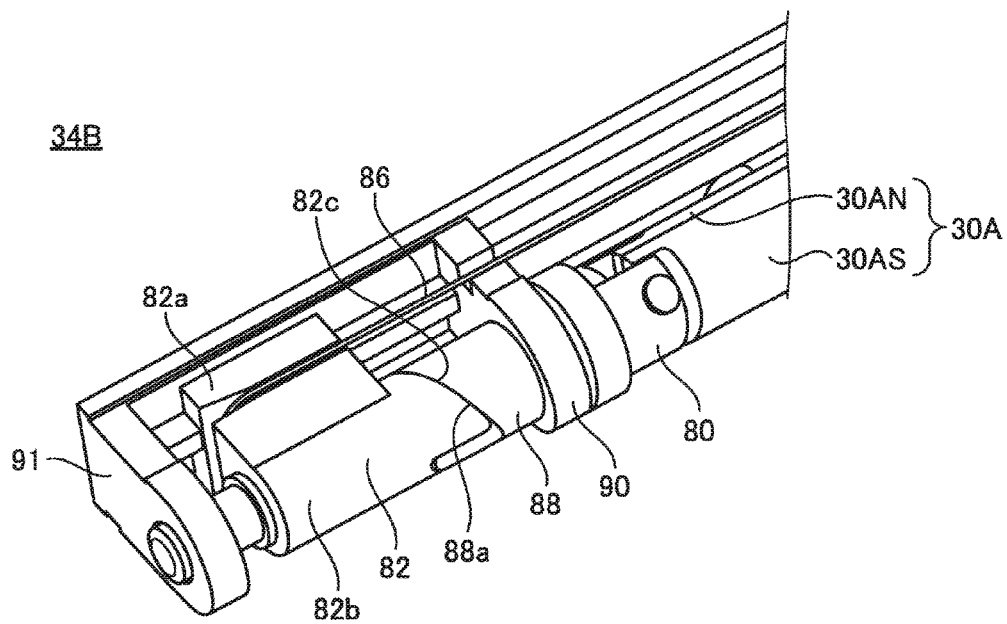
FIG. 12B is an enlarged perspective view of the main part in such a state that the moving part illustrated in FIG. 11 is in the unlock position.

FIG. 11 is a perspective view illustrating a structural example of a moving part 34B according to another variation. FIG. 12A is an enlarged perspective view of the main part in such a state that the moving part 34B illustrated in FIG. 11 is in the lock position. FIG. 12B is an enlarged perspective view of the main part in such a state that the moving part 34B illustrated in FIG. 11 is in the unlock position.

In comparison with the moving part 34A, the moving part 34B is different in rotational structure of the first magnet 30A on the side of the accessory device 14. As illustrated in FIG. 11, the moving part 34B has rotary members 80, 81, a drive cam 82, a rotary base 84, and a shape-memory alloy 86. Like the moving part 34 illustrated in FIG. 3A, moving parts 34B are provided in positions on the right and left of the rear edge portions inside the chassis 24 together with the first magnet 30A, respectively.

The rotary base 84 is a rod-like member extending in the right-left direction, which is fixed to the bottom face inside the chassis 24.

Each of the rotary members 80, 81 is a cylindrical shaft supported rotatably about the axis thereof in each of the right and left end portions of the rotary base 84, respectively. The first magnet 30A is held between the right and left rotary members 80, 81. A pressure-receiving cam 88 is coupled to the right rotary member 80 (left in FIG. 11) concentrically with the rotary member 80 in a manner unnecessary to rotate. The pressure-receiving cam 88 is supported rotatably relative to a bearing arm 90 of the rotary base 84 and immovably in the axial direction.

The first magnet 30A is a cylindrical magnet supported concentrically between the rotary members 80, 81. For example, when the coupling mechanism 16 is in the lock position, the first magnet 30A is so arranged that the N pole 30AN will face the upper half of the cylinder and the S pole 30AS will face the lower half of the cylinder.

The drive cam 82 is supported slidably with respect to the rotary base 84 in the right-left direction. The drive cam 82 has a base part 82*a* around which the shape-memory alloy 86 is wound, and a cam part 82*b* arranged concentrically with the rotary member 80 and the pressure-receiving cam 88. The cam part 82*b* has a cam face 82*c* that presses a cam face 88*a* of the pressure-receiving cam 88 while sliding on the cam face 88*a* to rotate the pressure-receiving cam 88 about the axis. The cam part 82*b* is supported movably relative to the bearing arm 91 of the rotary base 84 in the axial direction. A shaft hole in which a shaft member 88*b* projecting from the shaft center of the pressure-receiving cam 88 in the axial direction is inserted rotatably and movably in the axial direction is formed in the cam part 82*b*.

Like the shape-memory alloy 40, 66 mentioned above, the shape-memory alloy 86 is an alloy that returns to its original shape when being heated to a predetermined temperature or higher, which is connected to an electric circuit, not illustrated. The shape-memory alloy 86 is a U-shaped wire extending in the right-left direction along the rotary base 84, and bent around the base part 82*a* of the drive cam 82 and turned back. The U-shaped, turned-back portion of the shape-memory alloy 86 is wound around the base part 82*a*, and both ends thereof are fixed in parallel to a support stand 84*a* provided on the left side of the rotary base 84 to project, respectively. In this disclosure, the shape-memory alloy 86 has a shape extending in the longitudinal direction when no current is applied, and returns to an original shape to expand or contract in the longitudinal direction by Joule heat generated when a predetermined current is applied.

Since the coupling mechanism 16 having the moving part 34B is controlled by the control unit 22 as to whether current is applied to the shape-memory alloy 86 and the energization period of time substantially in the same manner as that of the moving part 34 mentioned above, the shape-memory alloy 86 elastically deforms to expand or contract so as to slide the drive cam 82 in the right-left direction. This causes the cam face 88*a* of the cam part 82*b* to move to the left to press the cam face 82*c* of the pressure-receiving cam 88 so as to rotate the pressure-receiving cam 88 about the axis in order to rotate the rotary members 80, 81 about the axis (see FIG. 12A and FIG. 12B). As a result, the shape-memory alloy 86 functions as an actuator to rotate the first magnet 30A about the axis. Note that the rotational positions of the first magnet 30A by the moving part 34B may be the same as those in the structural example illustrated in FIG. 10A to FIG. 10C.

Figure 13:
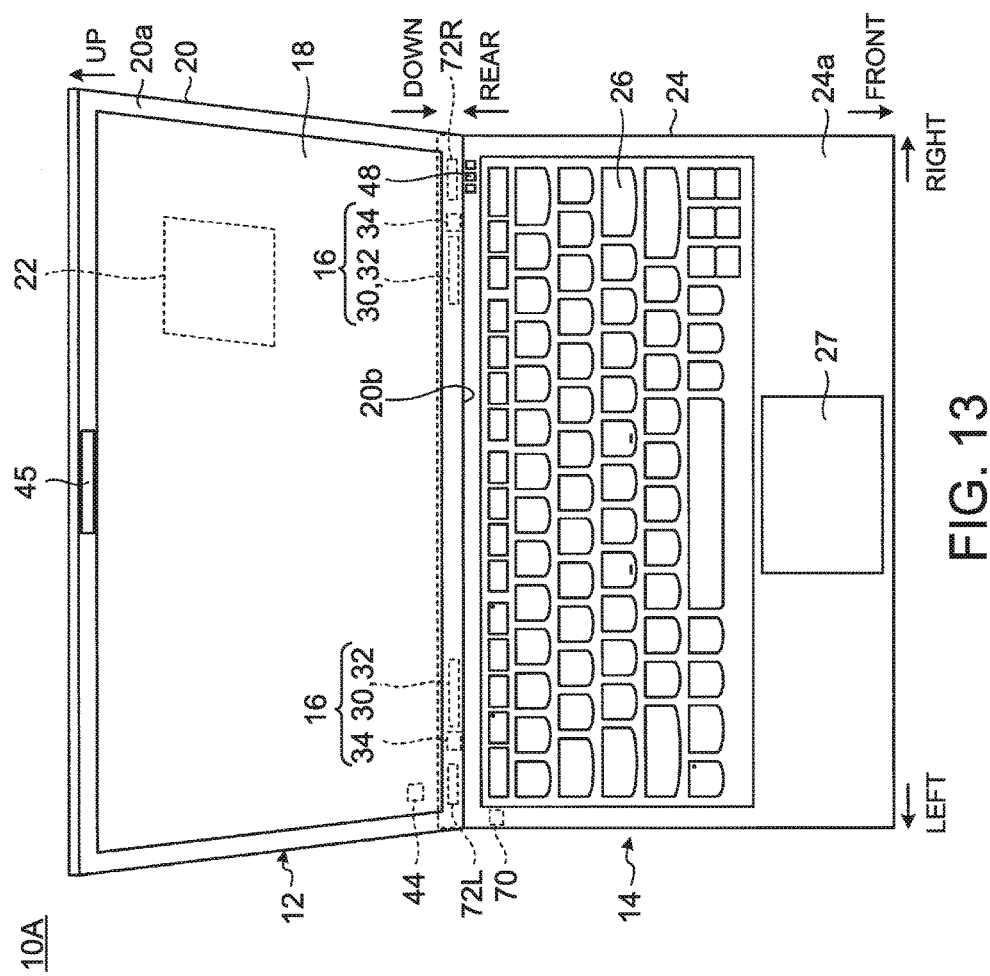
FIG. 13 is a configuration diagram of an electronic apparatus according to a second embodiment when looking down from a front upper side.

FIG. 13 is a configuration diagram of an electronic apparatus 10A according to a second embodiment when looking down from a front upper side.

As illustrated in FIG. 13, the electronic apparatus 10A includes an acceleration sensor 70 on the side of the accessory device 14, and a pair of right and left torque sensors 72L, 72R provided in coupling parts of the portable information device 12 and the accessory device 14. A point different from the electronic apparatus 10 illustrated in FIG. 1 is that the second pressure-sensitive sensor 46, 46A is omitted.

The acceleration sensor 70 is a sensor capable of detecting an inclination of the accessory device 14 (electronic apparatus 10A). The electronic apparatus 10A may also be configured to have only either of the acceleration sensors 44, 70.

The torque sensors 72L, 72R are provided on both right and left ends of the coupling face 24*b* of the accessory device 14, respectively. Each of the torque sensors 72L, 72R is a sensor pressed by the lower face 20*b* of the portable information device 12 coupled to the coupling face 24*b* through the coupling mechanism 16 to be able to output a signal corresponding to the pressure of the lower face 20*b*.

Figure 14A:
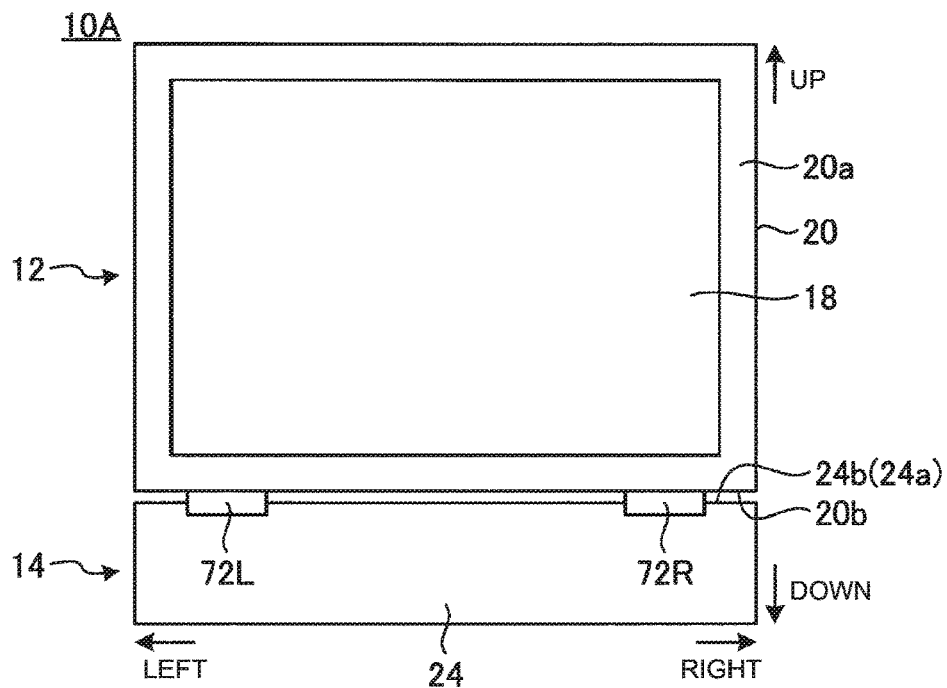
FIG. 14A is a front view schematically illustrating a state in which the portable information device is attached to the accessory device.
Figure 14B:
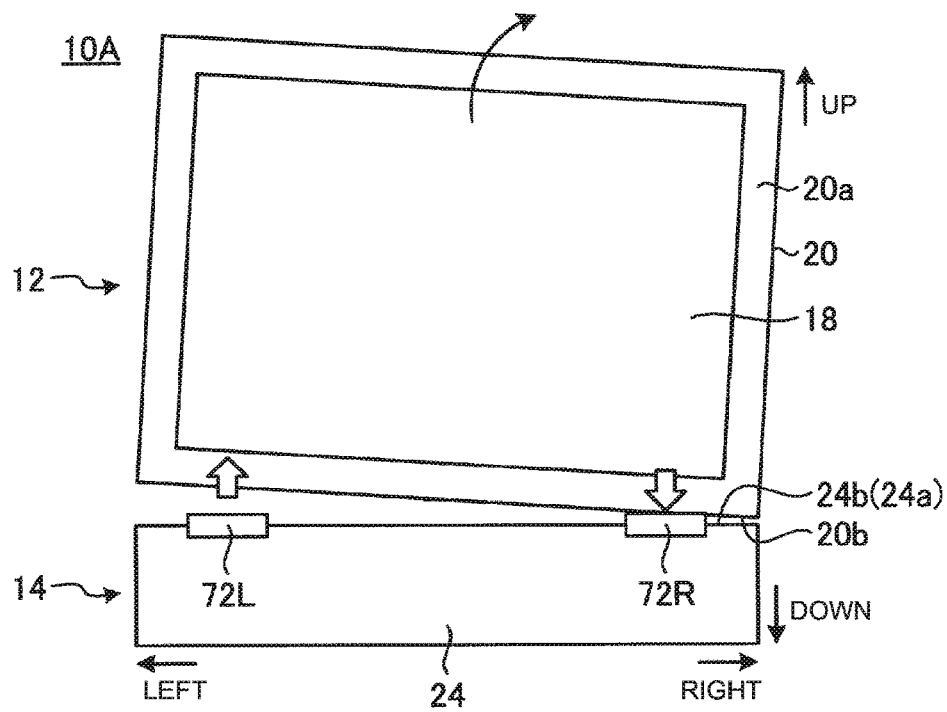
FIG. 14B is a front view illustrating a state in which the portable information device is held by one hand and lifted up while being twisted from the state illustrated in FIG. 14A.

FIG. 14A is a front view schematically illustrating a state in which the portable information device 12 is attached to the accessory device 14. FIG. 14B is a front view illustrating a state in which the portable information device 12 is held by one hand and lifted up while being twisted from the state illustrated in FIG. 14A.

In the state where the portable information device 12 is attached to the accessory device 14 as illustrated in FIG. 14A, the torque sensors 72L, 72R output, for example, predetermined reference torque. From this state, the user holds and lifts up the upper edge portion of the portable information device 12 while twisting the portable information device 12, for example, as illustrated in FIG. 14B. As a result, the torque sensor 72L located outside of the turn of the portable information device 12 outputs a torque of a predetermined value or less, which is smaller than the reference torque, and the torque sensor 72R located inside of the turn of the portable information device 12 outputs a torque of the predetermined value or more, which is larger than the reference torque. In the following, such a state that one torque sensor 72L outputs the torque of the predetermined value or less, which is smaller than the reference torque, and the other torque sensor 72R outputs the torque of the predetermined value or more, which is larger than the reference torque is also called a "state of outputting detaching torque."

Figure 15:
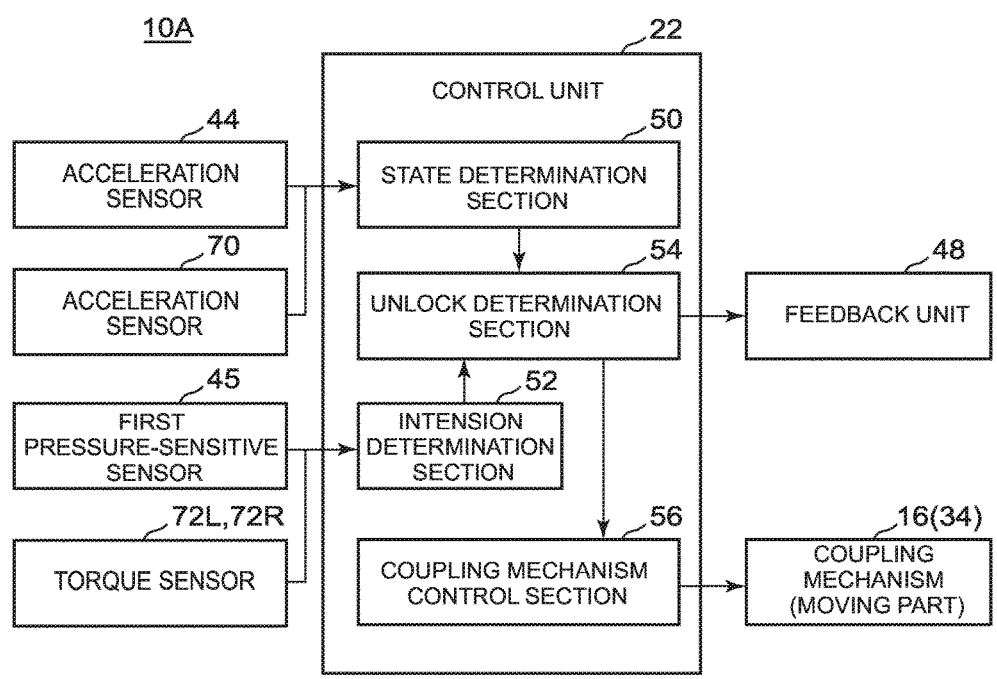
FIG. 15 is a block diagram illustrating a control system of the electronic apparatus illustrated in FIG. 13.

FIG. 15 is a block diagram illustrating a control system of the electronic apparatus 10A illustrated in FIG. 13.

As illustrated in FIG. 15, the control system of the electronic apparatus 10A is different from the control system of the electronic apparatus 10 illustrated in FIG. 6 in that the detection results of the acceleration sensors 44, 70 are sent to the state determination section 50, and the detection results of the first pressure-sensitive sensor 45, and the torque sensors 72L, 72R are sent to the intention determination section 52.

Based on the detection signals from the acceleration sensors 44, 70, the state determination section 50 determines whether the electronic apparatus 10A is in a predetermined stable position, and notifies the determination result to the unlock determination section 54. When determining from the detection results of the acceleration sensors 44, 70 that, for example, the portable information device 12 is stable at a constant angle to the vertical direction and the accessory device 14 is stable in a constant position with respect to the horizontal direction on a desk or the like without any large movement for a given length of time, the state determination section 50 determines that the electronic apparatus 10A is in the predetermined stable position. Thus, the acceleration sensors 44, 70 function as state detectors that detect whether the electronic apparatus 10A is in the predetermined stable position.

Based on the detection signals from the first pressure-sensitive sensor 45 and the torque sensors 72L, 72R, the intention determination section 52 determines whether the user has an intention of detaching the portable information device 12 from the accessory device 14, and notifies the determination result to the unlock determination section 54.

When detecting that the first pressure-sensitive sensor 45 is pressed at a pressure of a predetermined value or more, the intention determination section 52 determines that the portable information device 12 is held stably. In other words, when the upper edge portion of the portable information device 12 is held by one hand H and the first pressure-sensitive sensor 45 is pressed at the pressure of the predetermined value or more, for example, as illustrated in FIG. 2B, the intention determination section 52 determines that the portable information device 12 is in a stably held state less likely to fall. In the state where the portable information device 12 is determined to be stably held from the output of the first pressure-sensitive sensor 45, the intention determination section 52 further determines the detection results from the torque sensors 72L, 72R. In other words, when the portable information device 12 is lifted up while being twisted as illustrated in FIG. 14B, the detaching torque is output from the torque sensors 72L, 72R. As a result, the intention determination section 52 determines that there is an intention (detaching intention) of detaching the portable information device 12 from the accessory device 14. Thus, the first pressure-sensitive sensor 45 functions as a holding detector that detects the stable holding of the portable information device 12, or an intention detector that detects whether there is the intention of detaching the portable information device 12 from the accessory device 14. The torque sensors 72L, 72R function as intention detectors that detect whether there is the intention of detaching the portable information device 12 from the accessory device 14.

Next, detaching operation of the portable information device 12 from the accessory device 14 in the electronic apparatus 10A will be described.

Figure 16A:
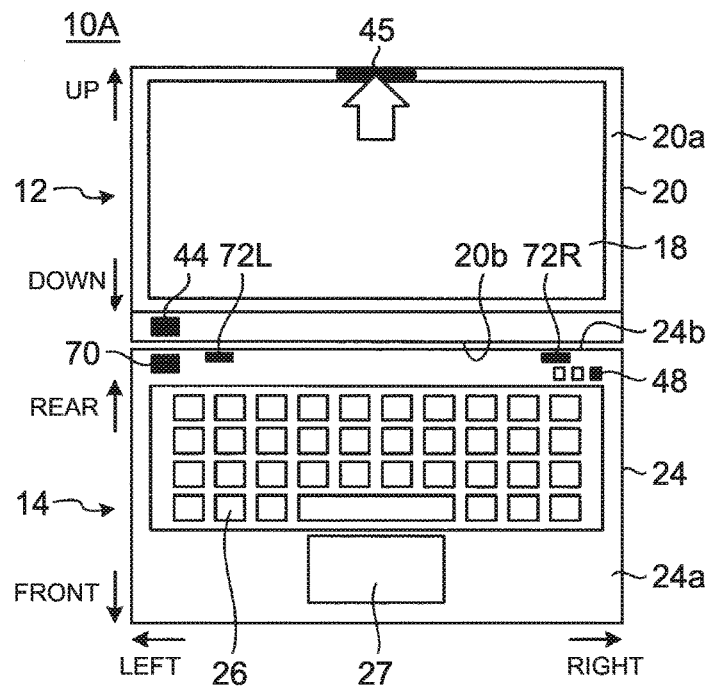
FIG. 16A is an explanatory view illustrating a state where a first pressure-sensitive sensor of the electronic apparatus is pressed.
Figure 16B:
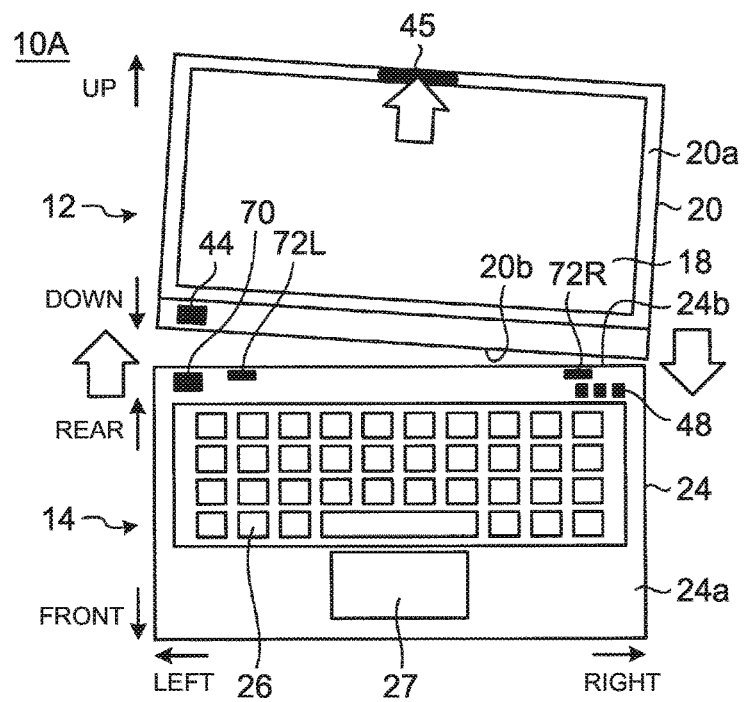
FIG. 16B is a front view illustrating a state where the portable information device is held and lifted up while being twisted from the state illustrated in FIG. 16A.

FIG. 16A is an explanatory view illustrating a state where the first pressure-sensitive sensor 45 of the electronic apparatus 10A is pressed. FIG. 16B is a front view illustrating a state where the portable information device 12 is held and lifted up while being twisted from the state illustrated in FIG. 16A.

In the state of attaching the portable information device 12 to the accessory device 14, the first magnet 30 of the coupling mechanism 16 of the electronic apparatus 10A is in the lock position like the electronic apparatus 10 illustrated in FIG. 5A. In this case, in the electronic apparatus 10A, the detection results from the acceleration sensors 44, 70, the first pressure-sensitive sensor 45, and the torque sensors 72L, 72R are received by the state determination section 50 and the intention determination section 52, and determination processing in the unlock determination section 54 is continuously performed.

In this state, suppose that the user touches the first pressure-sensitive sensor 45 at a pressure of less than a predetermined value without having the detaching intention. In this case, the unlock determination section 54 notifies the coupling mechanism control section 56 to keep the coupling mechanism 16 in the lock position based on the determination result of the intention determination section 52 that the user has no detaching intention regardless of the determination result of the state determination section 50. As a result, the locked state in which the portable information device 12 and the accessory device 14 are in the tightly coupled state is maintained like in the case of the electronic apparatus 10 illustrated in FIG. 5A.

Suppose next that the user presses the first pressure-sensitive sensor 45 at a pressure of the predetermined value or more with the intention of detaching the portable information device 12 as illustrated in FIG. 16A. In this case, the intention determination section 52 determines, based on the detection result from the first pressure-sensitive sensor 45, that the portable information device 12 is stably held. Then, for example, as illustrated in FIG. 16B, the user holds and lifts up the upper edge portion of the portable information device 12 while twisting the portable information device 12 from the accessory device 14 placed on the desk or the like. As a result, when the torque sensors 72L, 72R output detaching torques, the intention determination section 52 determines that there is the detaching intention, and notifies that effect to the unlock determination section 54. When the unlock determination section 54 has received the determination result from the state determination section that the electronic apparatus 10A is in the predetermined stable position, the unlock determination section 54 notifies the coupling mechanism control section to operate the coupling mechanism 16 to the unlock position. As a result, the portable information device 12 and the accessory device 14 become the unlocked state like in the electronic apparatus 10 illustrated in FIG. 5C.

As illustrated in FIG. 16A, when the first pressure-sensitive sensor 45 is pressed at the pressure of the predetermined value or more but no detaching torques are output from the torque sensors 72L, 72R, the unlock determination section 54 may notify the coupling mechanism control section 56 to operate the coupling mechanism 16 to the half-lock position. In other words, since it can be determined, from the detection result of the first pressure-sensitive sensor 45, that the portable information device 12 is held by the user in this state, it can be determined to operate the coupling mechanism 16 to the half-lock position. Note that the half-locked state in which one lamp of the feedback unit 48 is turned on is illustrated in FIG. 16A.

Thus, in the electronic apparatus 10A, the detection results from the acceleration sensors 44, 70 are notified to the state determination section 50, and the detection results from the first pressure-sensitive sensor 45 and the torque sensors 72L, 72R are notified to the intention determination section 52. This allows the user to turn on the first pressure-sensitive sensor 45 and the torque sensors 72L, 72R while holding the portable information device 12 from the accessory device 14 of the electronic apparatus 10A placed on the desk or the like. As a result, the user can detach the portable information device 12 from the accessory device 14 easily by one hand, achieving high user-friendliness.

As described above, the electronic apparatus 10 (10A) in this disclosure includes: the acceleration sensor (70) provided in at least either one of the portable information device 12 and the accessory device 14 to detect whether the electronic apparatus 10 (10A) is in the predetermined stable position; the pressure-sensitive sensors 45, 46 (torque sensors 72L, 72R) as an intention detector that detects whether there is an intention of detaching the portable information device 12 from the accessory device 14; and the control unit 22 that operates the coupling mechanism 16 when it is detected from the output of the acceleration sensor 44 (70) that the electronic apparatus 10 (10A) is in the stable position, and it is detected from the output of the pressure-sensitive sensors 45, 46 (torque sensors 72L, 72R) that there is the intention of detaching the portable information device 12 from the accessory device 14.

Thus, for example, when it is detected from the output of the state detector that the electronic apparatus (10A) is detected to be in the predetermined stable position where the electronic apparatus 10 (10A) is held on a desk or by a hand, and when it is detected by the intention detector that the user has the intention of detaching the portable information device 12 from the accessory device 14, the coupling mechanism 16 is operated in a direction from the lock position to the unlock position. In this case, in the electronic apparatus 10 (10A), the portable information device 12 and the accessory device 14 are tightly coupled by the coupling mechanism 16 when the electronic apparatus 10 (10A) is in the stable position and the user has no detaching intention. This can inhibit the portable information device 12 and the accessory device 14 from being separated from each other to make either one or both fall accidentally while the user is holding and carrying the electronic apparatus 10 (10A) by a hand. Further, when it is detected that the user is to separate the portable information device 12 from the accessory device 14, the electronic apparatus 10 (10A) can be such that the coupled state through the coupling mechanism will be set, for example, to release (unlock) or relaxation (half-lock). Therefore, the user can separate the portable information device 12 easily from the accessory device 14.

The coupling mechanism 16 has the first magnet 30 (30A) provided in the accessory device 14, the second magnet 32 (32A) provided in the portable information device 12 to be able to be attracted to the first magnet 30 (30A), and the moving part 34 (34A, 34B) provided in the accessory device 14 to move the first magnet 30 (30A) so as to change the attracted state between the first magnet 30 (30A) and the second magnet 32(32A). Therefore, in the electronic apparatus 10 (10A), since the control unit 22 can control the drive of the moving part 34 (34A, 34B) to adjust the coupling strength between the portable information device 12 and the accessory device 14. Thus, for example, even when the first magnet 30 (30A) and the second magnet 32 (32A) are magnets having strong attractive forces, the portable information device 12 and the accessory device 14 can be separated smoothly.

The moving part 34 (34A, 34B) can move the first magnet 30 (30A) to the lock position where the attractive force between the first magnet 30(30A) and the second magnet 32 (32A) becomes large (largest), to the unlock position where a repulsive force is generated between the first magnet 30(30A) and the second magnet 32 (32A), and to the half-lock position where the attractive force between the first magnet 30 (30A) and the second magnet 32 (32A) is set smaller than that in the lock position. In this case, since the coupled state between the portable information device 12 and the accessory device 14 can be controlled to the optimum state among the locked state, the unlocked state, and the half-locked state based on the detection results of the state detector and the intention detector, the user-friendliness of the electronic apparatus 10 (10A) is improved.

The electronic apparatus 10 (10A) uses the shape-memory alloy 40, 66, 86 as an actuator of the moving part (34A, 34B) that constitutes part of the coupling mechanism 16. Therefore, the electronic apparatus 10 (10A) can be made smaller and lighter compared with a case where an electric motor or the like is used as the actuator. Of course, the moving part 34, 34A, 34B may use the electric motor or the like as the actuator, rather than the shape-memory alloy 40, 66, 86. Further, the coupling mechanism 16 may have any structure other than that using the moving part 34 illustrated in FIG. 3A or that using the moving part 34A illustrated in FIG. 8.

Note that the present invention is not limited to the aforementioned embodiments, and can be modified freely without departing from the scope of the present invention.

In the above description, such a structure that the coupling mechanism 16 uses the attractive force between the first magnet 30 (30A) and the second magnet 32 (32A) is exemplified. However, for example, the coupling mechanism 16 may also have a structure of using a hook projecting from the coupling face 24b of the accessory device 14 and an engaging hole provided in the lower face 20b of the portable information device 12 in such a manner that this hook can be engaged with and disengaged from the engaging hole. In this case, if the hook engaged with the engaging hole in the lock position is moved in a disengagement direction (unlock direction) under the control of the control unit 22, the coupling mechanism 16 can be set in the unlock position.

In the above description, the structure of the coupling mechanism 16 to couple the portable information device 12 and the accessory device 14 is exemplified. However, for example, the coupling mechanism 16 may also be used to keep a display chassis of a clamshell type laptop PC in a closed state with respect to a main body chassis provided with a keyboard device.

In the above description, the structure of the coupling mechanism 16 to use the first magnet 30 (30A) and the second magnet 32 (32A) is exemplified. However, when either one of the first magnet 30 (30A) and the second magnet 32 (32A) is a magnet, the other may be an attracted body attracted to the magnet, such as a ferromagnetic metal. In other words, the coupling mechanism 16 may have the first attractive body (first magnet 30, 30A) and the second attractive body (second magnet 32, 32A) attracted to each other by a magnet in such a structure that the moving part 34, 34A, 34B moves these first and second attractive bodies relative to each other.

We claim:

1. An electronic apparatus including a portable information device and an accessory device capable of being removably coupled to each other through a coupling mechanism, comprising:

a state detector in at least one of the portable information device and the accessory device to detect whether the electronic apparatus is in a predetermined stable position;

an intention detector that detects whether there is an intention of detaching the portable information device from the accessory device; and a control unit that operates the coupling mechanism when it detects an output from the state detector that the electronic apparatus is in the stable position, and when it detects an output from the intention detector that there is the intention of detaching the portable information device from the accessory device, wherein:

the coupling mechanism has a first attractive body and a second attractive body that are magnetically attracted to each other, and a moving part that moves the first attractive body relative to the second attractive body to change an attracted state between the first attractive body and the second attractive body, the moving part moves the first attractive body and the second attractive body in a direction from a lock position, when an attractive force between the first attractive body and the second attractive body is large, and to a half-lock position when the attractive force between the first attractive body and the second attractive body is smaller than that of the lock position, the state detector has an acceleration sensor, the moving part can move the first attractive body relative to the second attractive body, to the lock position when the attractive force between the first attractive body and the second attractive body is largest, to an unlock position when a repulsive force is generated between the first attractive body and the second attractive body, and to the half-lock position when the attractive force between the first attractive body and the second attractive body is smaller than that of the lock position, the intention detector has a first pressure-sensitive sensor and a second pressure-sensitive sensor, and when it is detected from an output of the first pressure-sensitive sensor and the second pressure-sensitive sensor that there is an intention of detaching the portable information device from the accessory device, and in such a state that the electronic apparatus is detected to be in the stable position from output of the acceleration sensor, the control unit changes the first attractive body, from the lock position to the unlock position, when it is detected from only one of the first pressure-sensitive sensor and the second pressure-sensitive sensor that there is the intention of detaching the portable information device from the accessory device, and in a state where the electronic apparatus is detected to be in the stable position from the output of the acceleration sensor, the control unit changes the first attractive body from the lock position to the half-lock position.

2. The electronic apparatus according to claim 1, wherein: the coupling mechanism has:
- a first magnet, in the form of the first attractive body, in the accessory device,
- a second magnet, in the form of the second attractive body, in the portable information device and that can be attracted to the first magnet, and
- the moving part in the accessory device that moves the first magnet, to change an attracted state between the first magnet and the second magnet.

3. The electronic apparatus according to claim 2, wherein the moving part can move the first magnet to the lock position when an attractive force between the first magnet and the second magnet is large, to the unlock position when a repulsive force is generated between the first magnet and the second magnet, and to the half-lock position when the attractive force between the first magnet and the second magnet is smaller than that of the lock position.

4. The electronic apparatus according to claim 1, wherein: the first pressure-sensitive sensor is on an outer surface of the portable information device and the second pressure-sensitive sensor is on an outer surface of the accessory device.

5. The electronic apparatus according to claim 1, wherein: the intention detector has at least one of a pressure-sensitive sensor on an outer surface of the portable information device and a torque sensor that detects torque applied to a coupling part between the portable information device and the accessory device.

6. The electronic apparatus according to claim 1, wherein: the intention detector has a pressure-sensitive sensor and a torque sensor that detects torque applied to a coupling part between the portable information device and the accessory device, and
when it is detected from an output of the pressure-sensitive sensor and the torque sensor that there is an intention of detaching the portable information device from the accessory device and in such a state that the electronic apparatus is detected to be in the stable position from an output of the acceleration sensor, the control unit changes the first attractive body from the lock position to the unlock position.

7. The electronic apparatus according to claim 1, wherein the moving part has a shape-memory alloy that elastically deforms, when it reaches a predetermined temperature or higher, to move the first attractive body and the second attractive body relative to each other.

* * * * *